US011087483B2

(12) United States Patent
Arai

(10) Patent No.: US 11,087,483 B2
(45) Date of Patent: Aug. 10, 2021

(54) IMAGE PROCESSING APPARATUS

(71) Applicant: SUBARU CORPORATION, Tokyo (JP)

(72) Inventor: Shuji Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/844,612

(22) Filed: Apr. 9, 2020

(65) Prior Publication Data

US 2021/0019901 A1 Jan. 21, 2021

(30) Foreign Application Priority Data

Jul. 19, 2019 (JP) .............................. JP2019-133866

(51) Int. Cl.
*G06K 9/00* (2006.01)
*G06T 7/593* (2017.01)
*H04N 13/239* (2018.01)

(52) U.S. Cl.
CPC .......... *G06T 7/593* (2017.01); *G06K 9/00805* (2013.01); *G06T 2207/10012* (2013.01); *G06T 2207/20221* (2013.01); *G06T 2207/30261* (2013.01); *H04N 13/239* (2018.05)

(58) Field of Classification Search
CPC ........... G06T 7/593; G06T 2207/20221; G06T 2207/30252; G06T 2207/10012; G06T 2207/30261; G06K 9/00805; G06K 9/00791; H04N 13/239; H04N 2013/0092; H04N 2013/0081

See application file for complete search history.

(56) References Cited

U.S. PATENT DOCUMENTS

2011/0293145 A1* 12/2011 Nogami .................. G06T 11/00
382/103
2011/0311103 A1* 12/2011 Hammarstrom ... G06K 9/00805
382/104
2020/0211219 A1* 7/2020 Yamazaki ............ H04N 13/239
2020/0327350 A1* 10/2020 Anand ............... G06K 9/00805

FOREIGN PATENT DOCUMENTS

JP 2019-003527 A 1/2019

* cited by examiner

*Primary Examiner* — Carol Wang
(74) *Attorney, Agent, or Firm* — McDermott Will & Emery LLP

(57) ABSTRACT

An image processing apparatus includes a representative-distance calculator and a joining processor. The representative-distance calculator generates representative distance values of the basis of a distance image generated from a stereo image including an image of at least one object including a vehicle. The distance image includes distance values of pixels. The joining processor performs a joining process of joining a first image region and a second image region that are defined based on the image of the at least one object and disposed apart from each other in the stereo image. The joining processor performs a determining process of determining whether the first image region and the second image region each include an image of a side face of the vehicle. The joining processor performs the joining process when the first image region and the second image region each include the image of the side face of the vehicle.

7 Claims, 20 Drawing Sheets

IMAGE PROCESSING APPARATUS

CROSS-REFERENCE TO RELATED APPLICATIONS

The present application claims priority from Japanese Patent Application No. 2019-133866 filed on Jul. 19, 2019, the entire contents of which are hereby incorporated by reference.

BACKGROUND

The disclosure relates to an image processing apparatus that performs image processing.

There are image processing apparatuses that define image regions in frame images, and perform various types of processing on the images in the image regions. For example, Japanese Unexamined Patent Application Publication No. 2019-003527 discloses a feature extractor that extracts feature values from point cloud clusters. The feature cloud clusters are generated by segmenting a three-dimensional point cloud through clustering. The three-dimensional point cloud is a collection of three-dimensional points representing positions on a surface of an object.

SUMMARY

An aspect of the technology provides an image processing apparatus including a representative-distance calculator and a joining processor. The representative-distance calculator is configured to generate a plurality of representative distance values on the basis of a distance image generated from a stereo image. The stereo image includes an image of at least one object including a vehicle. The distance image includes distance values of pixels. The representative distance values correspond to different pixel columns in the distance image and are each a representative value of the distance values of a corresponding one of the pixel columns. The joining processor is configured to perform a joining process of joining a first image region and a second image region that are defined on the basis of the image of the at least one object in the stereo image. The first image region and the second image region are disposed apart from each other in the stereo image. The joining processor is configured to perform a determining process of determining whether the first image region and the second image region each include an image of a side face of the vehicle, and perform the joining process when the first image region and the second image region each include the image of the side face of the vehicle. The joining processor is configured to perform the determining process on the basis of a plurality of first representative distance values out of the representative distance values, a plurality of second representative distance values out of the representative distance values, and pixel distance values. The first representative distance values correspond to the pixel columns belonging to the first image region. The second representative distance values correspond to the pixel columns belonging to the second image region. The pixel distance values are the distance values of the pixels in the distance image disposed between the first image region and the second image region.

An aspect of the technology provides an image processing apparatus including circuitry. The circuitry is configured to generate a plurality of representative distance values on the basis of a distance image generated from a stereo image. The stereo image includes an image of at least one object including a vehicle. The distance image includes distance values of pixels. The representative distance values correspond to different pixel columns in the distance image and are each a representative value of the distance values of a corresponding one of the pixel columns. The circuitry is further configured to perform a joining process of joining a first image region and a second image region that are defined on the basis of the image of the at least one object in the stereo image. The first image region and the second image region are disposed apart from each other in the stereo image. The circuitry is configured to perform a determining process of determining whether the first image region and the second image region each include an image of a side face of the vehicle, and perform the joining process when the first image region and the second image region each include the image of the side face of the vehicle. The circuitry is configured to perform the determining process on the basis of a plurality of first representative distance values out of the representative distance values, a plurality of second representative distance values out of the representative distance values, and pixel distance values. The first representative distance values correspond to the pixel columns belonging to the first image region. The second representative distance values correspond to the pixel columns belonging to the second image region. The pixel distance values are the distance values of the pixels in the distance image disposed between the first image region and the second image region.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

There is a demand for an image processing apparatus that is able to define image regions in a frame image appropriately.

It is desirable to provide an image processing apparatus that is able to define image regions appropriately.

Embodiments of the disclosure will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

EMBODIMENTS

Configuration Example

Figure 1:
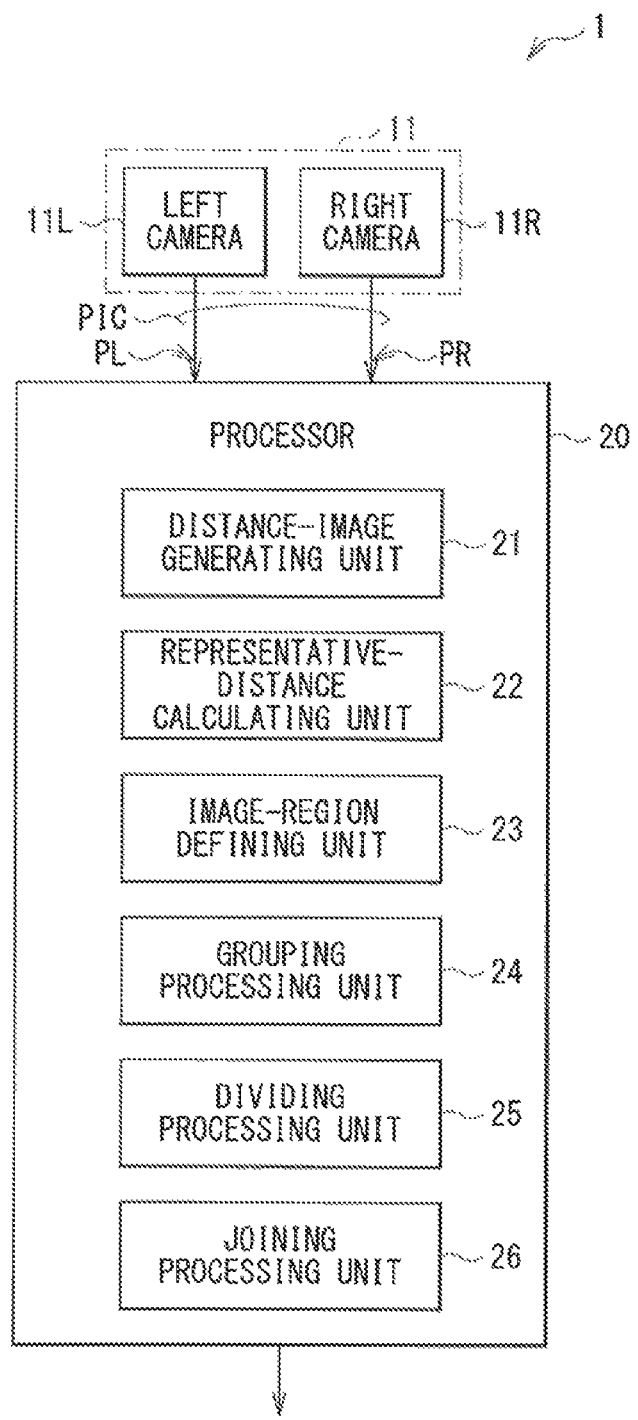
FIG. 1 is a block diagram illustrating a configuration example of an image processing apparatus according to an example embodiment of the technology.

FIG. 1 illustrates a configuration example of an image processing apparatus (image processing apparatus 1) according to an embodiment. The image processing apparatus 1 may include stereo cameras 11 and a processor 20. The image processing apparatus 1 may be mounted on a vehicle 10, such as an automobile.

The stereo cameras 11 may generate a pair of images by capturing images in the forward direction from the vehicle 10. The pair of images may be a left image PL and a right image PR having different parallaxes. The stereo cameras 11 may include a left camera 11L and a right camera 11R. The left camera 11L and the right camera 11R may each include lenses and an image sensor. The left camera 11L and the right camera 11R in this example may be disposed on the upper portion of the front windshield of the vehicle 10 apart from each other by a predetermined distance in the width direction of the vehicle 10. The left camera 11L and the right camera 11R may perform image capturing operations in synchronization with each other. The left camera 11L may generate the left image PL, and the right camera 11R may generate the right image PR. The left image PL and the right image PR may constitute a stereo image PIC. The left image PL and the right image PR may have differences in parallaxes. The stereo cameras 11 may perform an image capturing operation at a predetermined frame rate, such as 60 fps, to generate a series of stereo images PIC.

The processor 20 may define image regions R in a stereo image PIC supplied from the stereo cameras 11. The image regions R may be defined so as to contain various objects, such as a vehicle in front of the vehicle 10, captured in the left image PL and the right image PR. The processor 20 may recognize the objects in the image regions R. For example, the processor 20 may perform traveling control of the vehicle 10 or cause a console monitor to display information on the recognized objects on the basis of the information on the objects recognized by the processor 20. The processor 20 may include, for example, a central processing unit (CPU) that executes programs, a random-access memory (RAM) that temporarily stores processed data, and a read-only memory (ROM) that stores programs. The processor 20 may include a distance-image generating unit 21, a representative-distance calculating unit 22, an image-region defining unit 23, a grouping processing unit 24, a dividing processing unit 25, and a joining processing unit 26.

The distance-image generating unit 21 may perform predetermined image processing, including stereo matching and filtering, on the left image PL and the right image PR, and thereby generate a distance image PZ.

Figure 2:
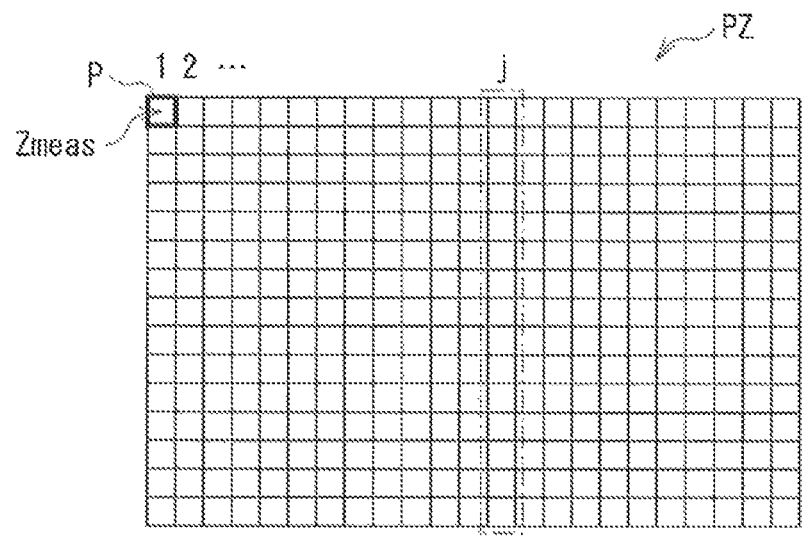
FIG. 2 is a diagram illustrating an example of a distance image.

FIG. 2 illustrates an example of a distance image PZ. In the distance image PZ, the horizontal axis may correspond to the x-axis extending in the vehicle width direction of the vehicle 10, and the vertical axis may correspond to the y-axis extending in the vehicle height direction of the vehicle 10. The same applies to the left image PL and the right image PR. The pixel value of each pixel P in the distance image PZ may correspond to the distance to a point in a three-dimensional real space corresponding to each pixel. The distance may be represented by a measured distance value Zmeas. In other words, the pixel value of each pixel P may correspond to a value on the z-axis in the vehicle length direction of the vehicle 10.

The representative-distance calculating unit 22 may calculate, on the basis of the distance image PZ, a representative distance value Zpeak for each column of pixels of the distance image PZ. For example, the representative-distance calculating unit 22 may sequentially select the columns of pixels in the distance image PZ. The representative-distance calculating unit 22 may then generate a histogram H based on the measured distance values Zmeas of each of the selected columns of pixels. The representative-distance calculating unit 22 may then calculate a representative distance value Zpeak for each of the selected columns of pixels on the basis of the corresponding histogram H.

Figure 3:
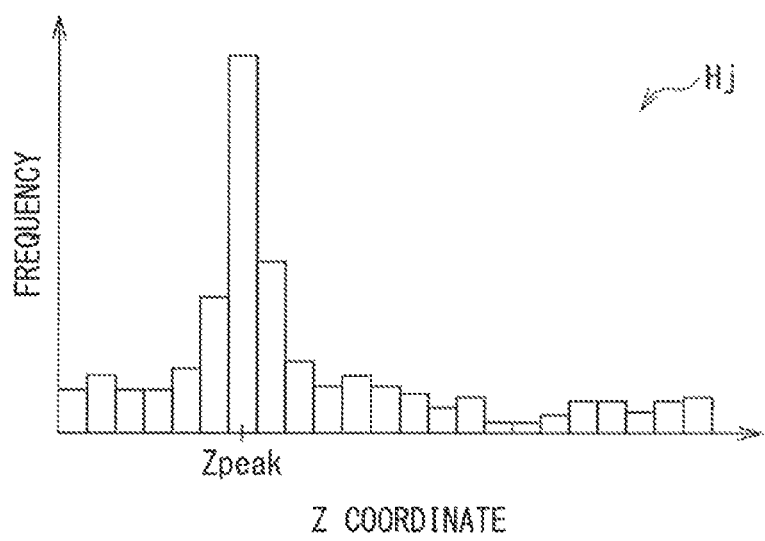
FIG. 3 is a diagram illustrating an example of a representative distance value.

FIG. 3 illustrates an example of a histogram Hj generated on the basis of the measured distance values Zmeas of a j-th column of pixels in the distance image PZ illustrated in FIG. 2. The horizontal axis may represent values on the z-axis, and the vertical axis may represent frequency. The representative-distance calculating unit 22 may obtain a value on the z-axis corresponding to the highest frequency as the representative distance value Zpeak. The representative-distance calculating unit 22 may generate such a histogram H for each column of pixels and calculate a representative distance value Zpeak for each histogram H.

The image-region defining unit 23 may define multiple image regions R in the distance image PZ. For example, the image-region defining unit 23 may define the image regions R so that each of the image regions R in the distance image PZ contains multiple pixels P of which measured distance values Zmeas are consecutive.

Figure 4:
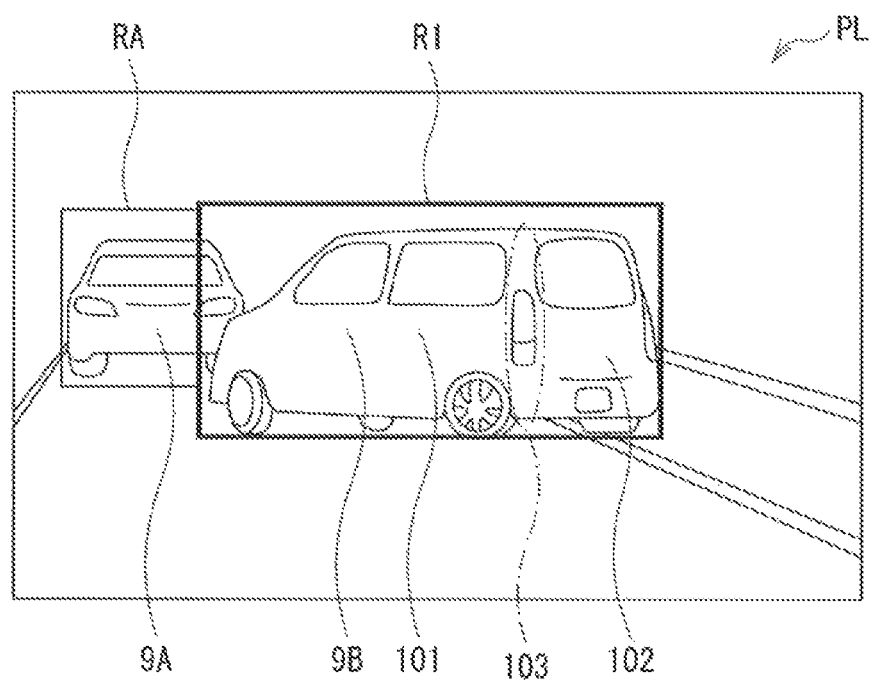
FIG. 4 is an image diagram illustrating an operation example of the processor illustrated in FIG. 1.

FIG. 4 illustrates an example of an image region R. In this example, the left image PL of the stereo image PIC may include images of two vehicles 9A and 9B in front of the vehicle 10 (which is hereinafter also referred to as an own vehicle). Note that this example will be described with reference to the left image PL, but the description may also apply to the right image PR or the distance image PZ.

The left image PL may include an image of the rear face of the vehicle 9A traveling along the road in front of the vehicle 10. Since the measured distance values Zmeas of the distance image PZ corresponding to the rear face of the vehicle 9A are consecutive, the image-region defining unit 23 may define one image region R (an image region RA) that contains the rear face of the vehicle 9A.

The left image PL may also include an image of a vehicle 9B cutting in front of the vehicle 10 from the side. The vehicle 9B may be oriented in a direction at an angle to the extending direction of the road. Therefore, the left image PL may include an image of a side face 101 of the vehicle 9B, an image of a rear face 102 of the vehicle 9B, and an image of a corner portion 103 between the side face 101 and the rear face 102 of the vehicle 9B. In this example, the measured distance values Zmeas corresponding to the side face 101, the rear face 102, and the corner portion 103 of the vehicle 9B in the distance image PZ may be consecutive. Therefore, the image-region defining unit 23 may define an image region R (an image region R1) containing images of the side face 101, the rear face 102, and the corner portion 103 of the vehicle 9B.

The grouping processing unit 24 may define one image region R by joining multiple image regions R in a process performed on the current stereo image PIC with reference to a process performed on a past stereo image PIC. For example, in a case where multiple image regions R are defined for a vehicle through the process performed on a current stereo image PIC, and where only one image region R has been defined for the same vehicle through the process performed on the previous stereo image PIC, the grouping processing unit 24 may join the multiple image regions R in the current stereo image PIC into one image region R.

The dividing processing unit 25 may perform a region dividing process A to divide a target image region R into two image regions R on the basis of the representative distance values Zpeak of the target image region R when a predetermined condition is satisfied. The region dividing process A may include a dividing process A1. In the dividing process A1, the dividing processing unit 25 may determine whether, for example, an image region R (an image region R1) contains an image of a corner portion of a vehicle on the basis of multiple representative distance values Zpeak of multiple columns of pixels belonging to the image region R1. If the image region R1 contains an image of a corner portion, the dividing processing unit 25 may divide the image region R1 into two image regions R (image regions R2 and R3) along the corner portion. That is, in the example in FIG. 4, the dividing processing unit 25 may determine that the image region R1 contains the corner portion 103 of the vehicle 9B. The dividing processing unit 25 may then divide the image region R1 into an image region R2 containing an image of the side face 101 of the vehicle 9B and an image region R3 containing an image of the rear face 102 of the vehicle 9B.

The joining processing unit 26 may perform a region joining process B to join two image regions R on the basis of the representative distance values Zpeak of the two image regions R, when a predetermined condition is satisfied.

The region joining process B may include a joining process B1. In the joining process B1, the joining processing unit 26 may join two image regions (image region R4 an R5) into a single image region R (an image region R6) when a section of a three-dimensional real space corresponding to an image in the image region R4 is disposed close to another section of the three-dimensional real space corresponding to an image in the image region R5. The joining processing unit 26 may determine whether a temporarily joined region including, for example, the two image regions R4 and R5 contains an image of a corner portion of a vehicle. If the region contains the image of the corner portion, the joining processing unit 26 may refrain from joining the two image regions R4 and R5.

The region joining process B may also include a joining process B2. In the joining process B2, the joining processing unit 26 may join two image regions (image region R7 an R8) into one image region R (an image region R9) when a predetermined condition is satisfied even if a section of a three-dimensional real space corresponding to the image in the image region R7 is disposed slightly apart from another section of the three-dimensional real space corresponding to the image in the image region R8. For example, the joining processing unit 26 may determine whether the two image regions R7 and R8 disposed apart from each other contain images of different portions of a side face of the same vehicle. When the image regions R7 and R8 contain images of different portions of the side face of the same vehicle, the joining processing unit 26 may join the image regions R7 and R8 to define the image region R9. For example, there may be a case in which the image region R7 contains an image of a front portion of a side face of a vehicle having a large vehicle length, such as a bus, and the image region R8 contains an image of a rear portion of the side face of the vehicle, as described below. That is, it may be difficult for the distance-image generating unit 21 to generate a highly accurate distance image PZ of, for example, a side face of a bus because it is difficult to perform pattern matching on the side face of a bus. This may result in the image regions R7 and R8 being respectively defined on the front portion and the rear portion of the side face of the bus. In such a case, the joining processing unit 26 may join the two image regions R7 and R8 to define the image region R9.

In this way, the processor 20 may recognize a vehicle in front of the vehicle 10. The processor 20 may then output information on the recognition result.

The dividing processing unit 25 of the image processing apparatus 1 having such a configuration may perform the dividing process A1 to divide an image region R (an image region R1) into two image regions R (image regions R2 and R3) when the image region R1 contains an image of a corner portion of a vehicle. The image region R2 may contain an image of a side face of the vehicle. The image region R3 may contain an image of a rear face of the vehicle. The joining processing unit 26 may refrain from joining the image regions R2 and R3 in the joining process B1 because the temporarily joined region including the image regions R2 and R3 contains a corner portion of a vehicle. In this way, the image processing apparatus 1 may separately define the image region R2 containing an image of the side face of the vehicle and the image region R3 containing an image of the rear face of the vehicle. This may allow the image processing apparatus 1 to separately recognize the side face and the rear face of the vehicle.

In the joining process B2, the joining processing unit 26 of the image processing apparatus 1 may join two image regions R (image regions R7 and R8) into an image region R (an image region R9) when the image region R7 contains an image of the front portion of the side face of a bus, and the image region R8 contains an image of the rear portion of the side face of the bus. In this way, the image processing apparatus 1 may define one image region R9 for one side face of a vehicle. This may allow the image processing apparatus 1 to recognize the side face of a vehicle as a single object.

In one embodiment, the representative-distance calculating unit 22 may serve as a "representative-distance calculator". In one embodiment, the measured distance value Zmeas may serve as a "distance value" or a "pixel distance value". In one embodiment, the representative distance value Zpeak may serve as a "representative distance value". In one embodiment, the joining processing unit 26 may serve as a "joining processor". In one embodiment, the joining process B2 may serve as a "joining process". In one embodiment, the image region R7 and the image region R8 may respectively serve as a "first image region" and a "second image region".

Example Workings and Effects

Example workings and effects of the image processing apparatus 1 according to an embodiment will now be explained.

Outline of Overall Operation

The outline of the overall operation of the image processing apparatus 1 will now be explained with reference to FIG. 1. The stereo cameras 11 may capture images in the forward direction from the vehicle 10 and generate a stereo image PIC including a left image PL and a right image PR. The processor 20 may define image regions R in a stereo image PIC supplied from the stereo cameras 11. The image regions R may so be defined as to contain images of various objects, such as a vehicle in front of the vehicle 10, captured in the left image PL and the right image PR. The processor 20 may then recognize the objects in the image region R.

Details of Operation

Figure 5:
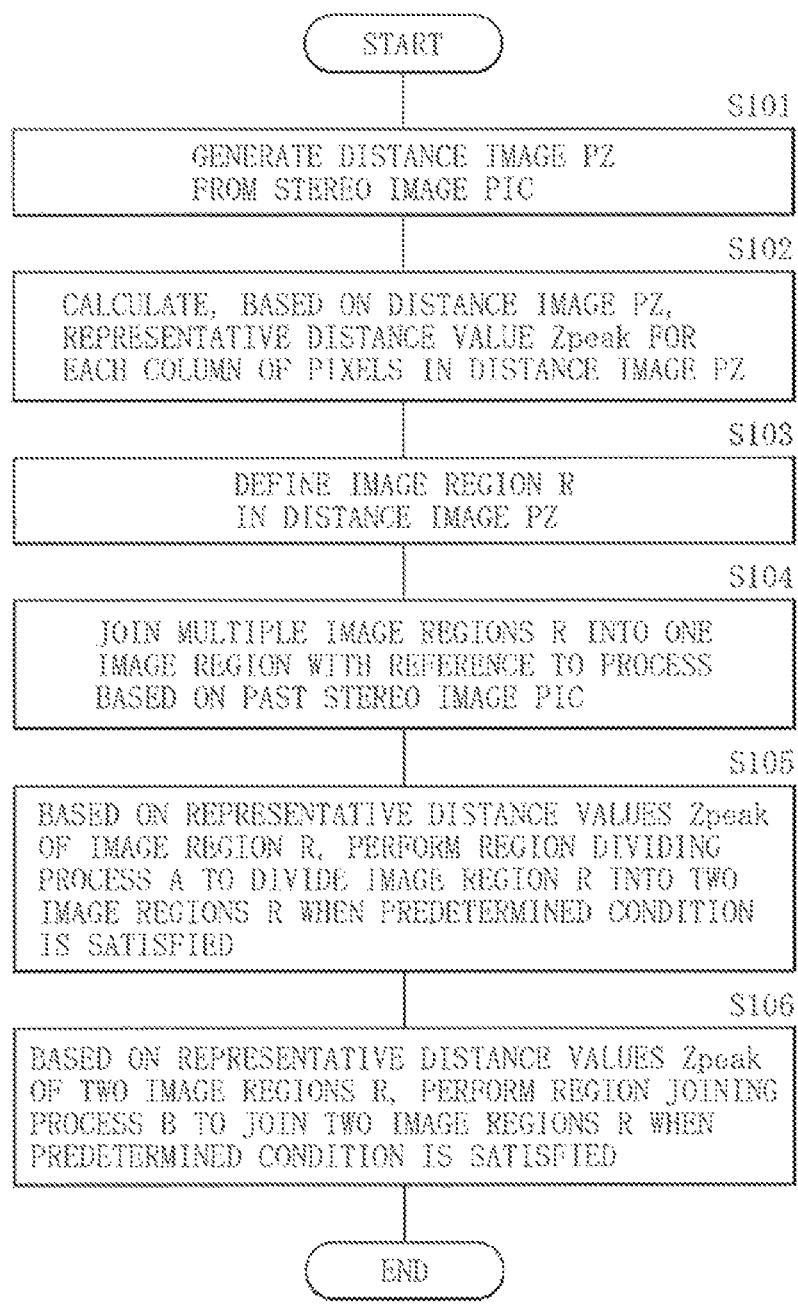
FIG. 5 is a flowchart illustrating an operation example of the processor illustrated in FIG. 1.

FIG. 5 illustrates an example operation of the processor 20. Every time a stereo image PIC is supplied from the stereo cameras 11, the processor 20 may generate a corresponding distance image PZ from the received stereo image PIC. The processor 20 may then define multiple image regions R in the distance image PZ. The processor 20 may then define at least one image region R by dividing a target image region R or joining two target image regions R. Details of these processes will now be explained.

The distance-image generating unit 21 may first perform predetermined image processing, including stereo matching and filtering, on a left image PL and a right image PR of a stereo image PIC, and thereby generate a corresponding distance image PZ (step S101).

The representative-distance calculating unit 22 may then calculate, on the basis of the distance image PZ, a representative distance value Zpeak for each column of pixels of the distance image PZ (step S102). For example, the representative-distance calculating unit 22 may sequentially select columns of pixels of the distance image PZ. The representative-distance calculating unit 22 may then generate a histogram H of the measured distance values Zmeas of each of the selected columns of pixels. Such a histogram H is illustrated in FIG. 3. The representative-distance calculating unit 22 may then determine a value on the z-axis having the highest frequency in the histogram H and identify this value as the representative distance value Zpeak. The representative-distance calculating unit 22 may generate a histogram H for every column of pixels to calculate a representative distance value Zpeak for each column of pixels.

The image-region defining unit 23 may then define multiple image regions R in the distance image PZ (step S103). For example, the image-region defining unit 23 may define the image regions R so that each of the image regions R in the distance image PZ contains multiple pixels P of which measured distance values Zmeas are consecutive.

The grouping processing unit 24 may then define one image region R by joining multiple image regions through a process performed on the current stereo image PIC with reference to a process performed on a past stereo image PIC (step S104). For example, in a case where multiple image regions R are defined for a vehicle through the process performed on a current stereo image PIC, and where only one image region R has been defined for the same vehicle through the process performed on the previous stereo image PIC, the grouping processing unit 24 may join the multiple image regions R in the current stereo image PIC into one image region R.

The dividing processing unit 25 may then perform the region dividing process A to divide a target image region R into two image regions R on the basis of the representative distance values Zpeak of the target image region R, when a predetermined condition is satisfied (step S105). The dividing process A1 included in the region dividing process A will be explained in detail below.

The joining processing unit 26 may then perform the region joining process B to join two image regions R on the basis of the representative distance values Zpeak of the two image regions R, when a predetermined condition is satisfied (step S106). The joining processes B1 and B2 of the region joining process B will be explained in detail below.

The flow may then end.

Dividing Process A1

The dividing process A1 of the region dividing process A performed in step S105 illustrated in FIG. 5 will now be explained in detail.

In the dividing process A1, the dividing processing unit 25 may determine whether, for example, an image region R (an image region R1) contains an image of a corner portion of a vehicle on the basis of multiple representative distance values Zpeak of multiple columns of pixels belonging to the image region R1. If the image region R1 contains an image of a corner portion, the dividing processing unit 25 may divide the image region R1 into two image regions R (image regions R2 and R3) along the corner portion.

Figure 6:
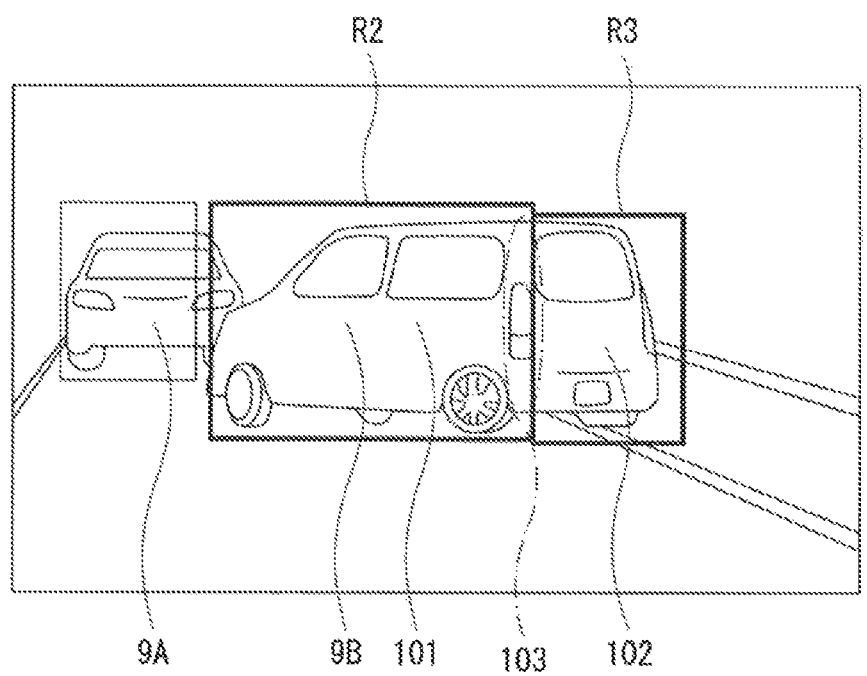
FIG. 6 is another image diagram illustrating an operation example of the processor illustrated in FIG. 1.

FIG. 6 illustrates examples of the image regions R2 and R3 defined by dividing the image region R1 illustrated in FIG. 4 through the dividing process A1. As illustrated in FIG. 4, the image region R1 may contain an image of the side face 101 of the vehicle 9B, an image of the rear face 102 of the vehicle 9B, and an image of the corner portion 103 of the vehicle 9B. The dividing processing unit 25 may determine that the image region R1 contains the image of the corner portion 103. The dividing processing unit 25 may divide the image region R1 along the corner portion 103 into the image region R2 containing an image of the side face 101 of the vehicle 9B and the image region R3 containing an image of the rear face 102 of the vehicle 9B, as illustrated in FIG. 6. In this way, the processor 20 may separately recognize the side face and the rear face of the vehicle 9B.

Figure 7:
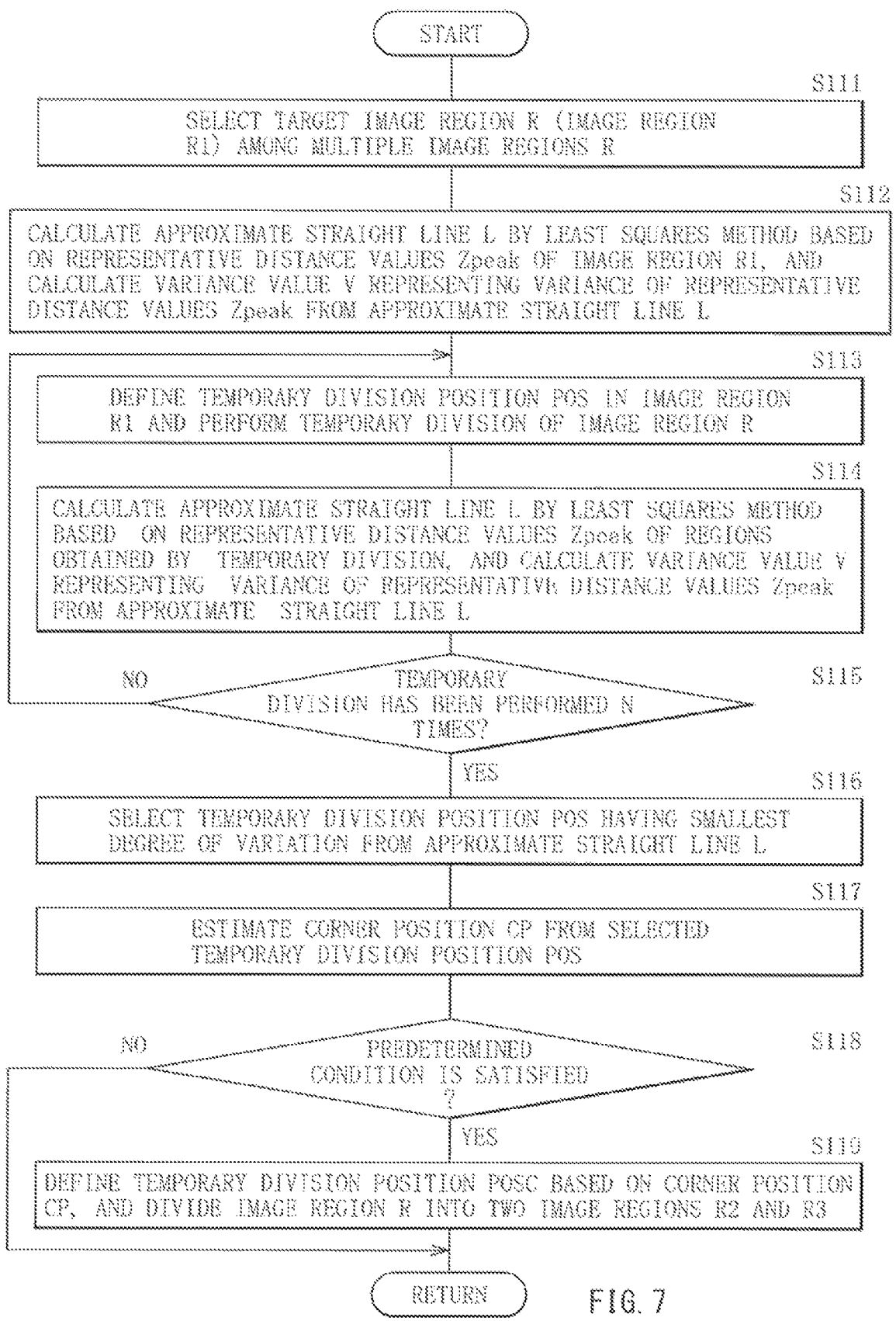
FIG. 7 is a flowchart illustrating an example of a dividing process performed by the dividing processing unit illustrated in FIG. 1.

FIG. 7 illustrates an example of the dividing process A1.

The dividing processing unit 25 may first select a target image region R (an image region R1) among multiple image regions R (step S111).

The dividing processing unit 25 may then calculate an approximate straight line L by the least squares method on the basis of the representative distance values Zpeak of the image region R1 and calculate a variance value V representing the variance of the representative distance values Zpeak from the approximate straight line L (step S112).

Figure 8:
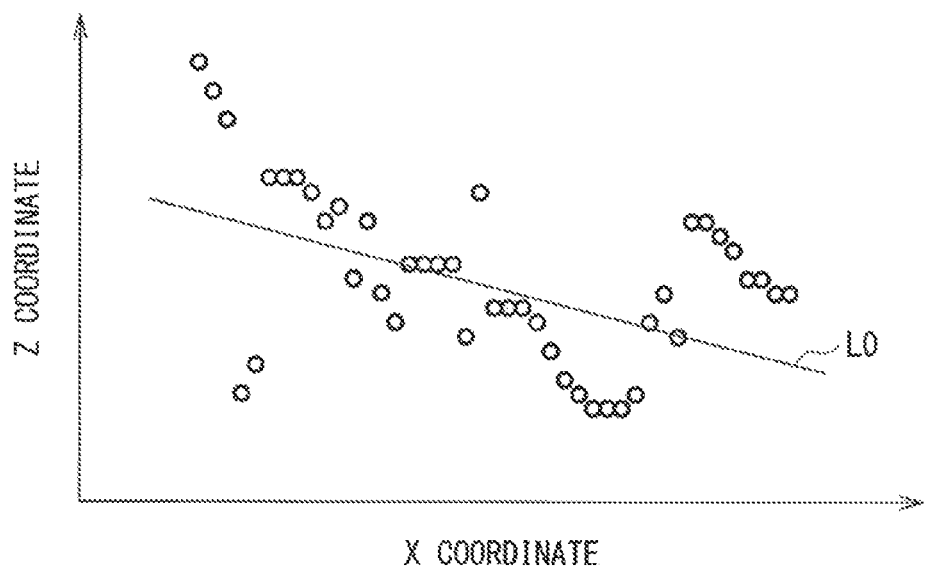
FIG. 8 is a diagram illustrating an operation example of the dividing processing unit illustrated in FIG. 1.

FIG. 8 illustrates an example of the process for step S112. The horizontal axis may correspond to the x-axis, and the vertical axis may correspond to the z-axis. As illustrated in FIG. 8, multiple coordinate points corresponding to the representative distance values Zpeak of the columns of pixels belonging to the image region R1 are plotted in such an x-z coordinate plane. The dividing processing unit 25 may calculate an approximate straight line L0 by the least squares method on the basis of the representative distance values Zpeak. The dividing processing unit 25 may then calculate the variance value V0 representing the variance of the representative distance values Zpeak from the approximate straight line L0.

The dividing processing unit 25 may then establish a temporary division position POS in the image region R1, temporarily divide the image region R1 (step S113), calculate an approximate straight line L by the least squares method on the basis of the representative distance values Zpeak of each of the regions obtained by the temporary division, and calculate a variance value V representing the variance of the representative distance values Zpeak from the approximate straight line L (step S114). If the temporary division has not been performed a predetermined number of times or N times (step S115: NO), the process may return to step S113. The processes of steps S113 to S115 may be repeated until the temporary division is performed N times.

FIGS. 9A to 9E illustrate examples of the processes of steps S113 to S115. In these examples, the predetermined number of times or N times may be five times. The dividing processing unit 25 may define five temporary division positions POS (temporary division positions POS1 to POS5) in the image region R1.

Figure 9A:
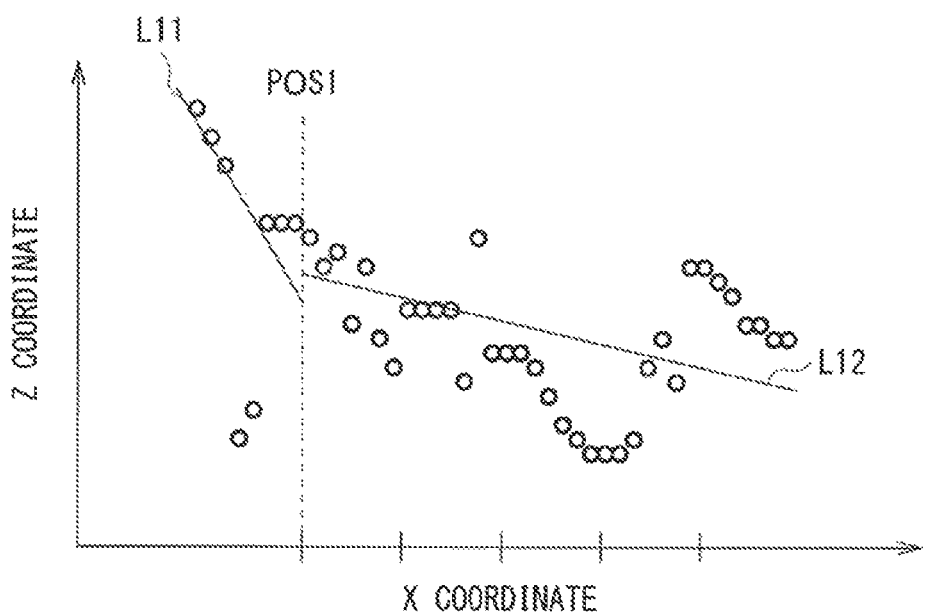
FIG. 9A is another diagram illustrating an operation example of the dividing processing unit illustrated in FIG. 1.

For example, as illustrated in FIG. 9A, the dividing processing unit 25 may perform temporary division at the temporary division position POS1. The dividing processing unit 25 may then calculate an approximate straight line L11 by the least squares method on the basis of the representative distance values Zpeak of a region on the left side of the temporary division position POS1 and calculate a variance value V11 representing the variance of the representative distance values Zpeak from the approximate straight line L11. The dividing processing unit 25 may also calculate an approximate straight line L12 by the least squares method on the basis of the representative distance values Zpeak of a region on the right side of the temporary division position POS1 and calculate a variance value V12 representing the variance of the representative distance values Zpeak from the approximate straight line L12.

Figure 9B:
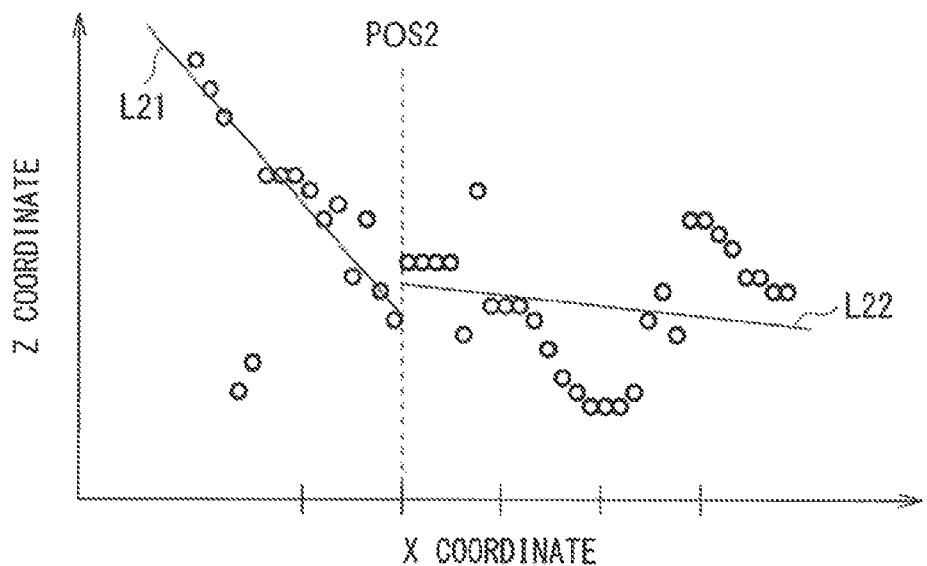
FIG. 9B is another diagram illustrating an operation example of the dividing processing unit illustrated in FIG. 1.
Figure 9C:
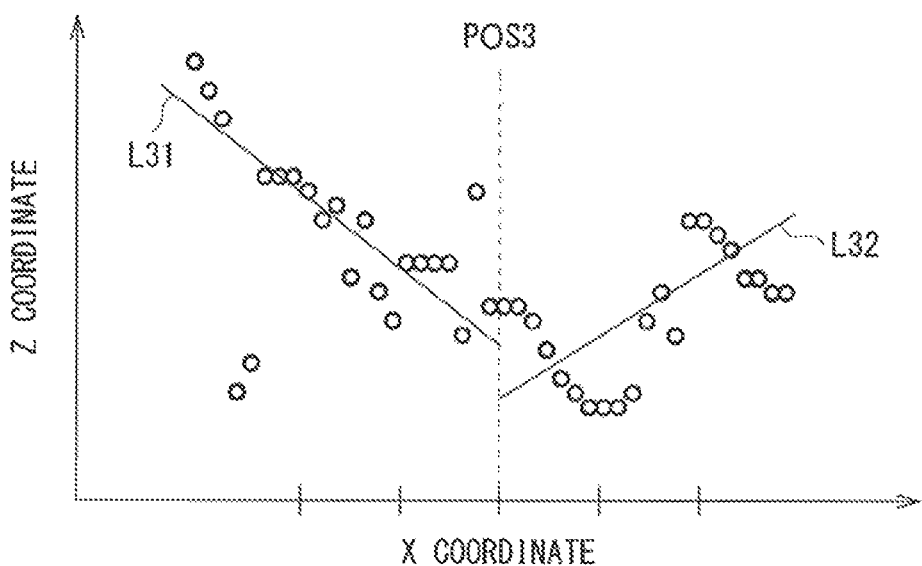
FIG. 9C is another diagram illustrating an operation example of the dividing processing unit illustrated in FIG. 1.
Figure 9D:
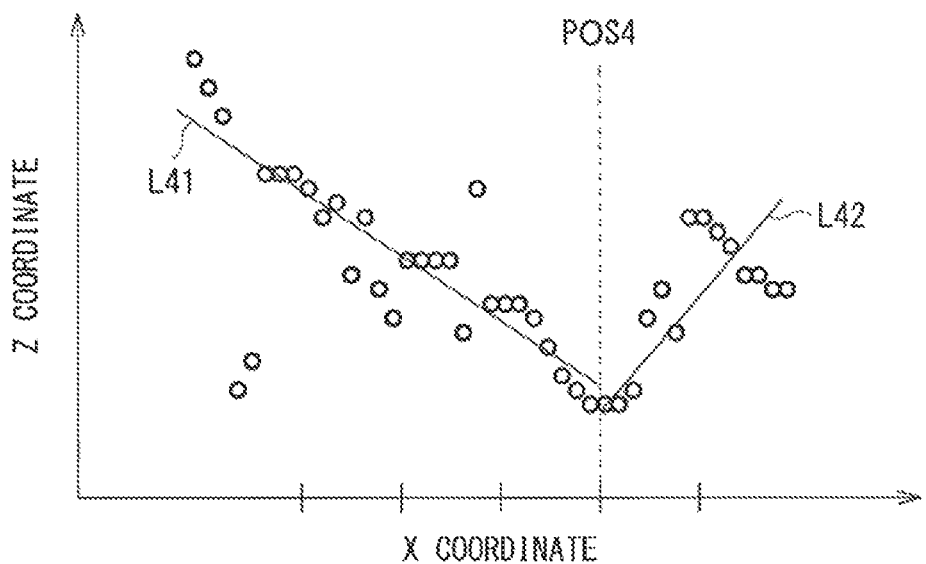
FIG. 9D is another diagram illustrating an operation example of the dividing processing unit illustrated in FIG. 1.
Figure 9E:
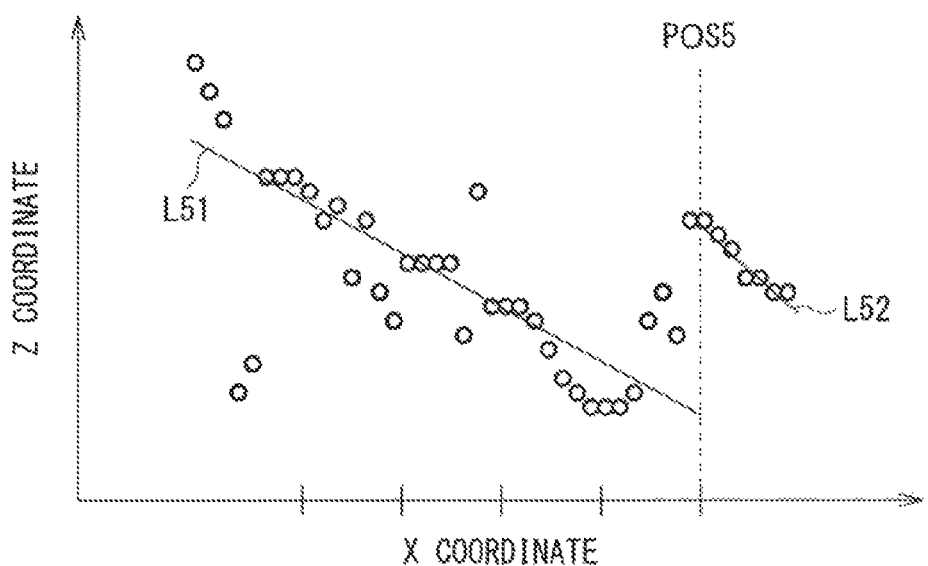
FIG. 9E is another diagram illustrating an operation example of the dividing processing unit illustrated in FIG. 1.

Similarly, the dividing processing unit 25 may perform temporary division to calculate approximate straight lines L21 and L22 and variance values V21 and V22 at a temporary division position POS2 illustrated in FIG. 9B, approximate straight lines L31 and L32 and variance values V31 and V32 at a temporary division position POS3 illustrated in FIG. 9C, approximate straight lines L41 and L42 and variance values V41 and V42 at a temporary division position POS4 illustrated in FIG. 9D, and approximate straight lines L51 and L52 and variance values V51 and V52 at a temporary division position POS5 illustrated in FIG. 9E.

The dividing processing unit 25 may then select the temporary division position POS having the smallest degree of variation from the approximate straight line L (step S116). The degree of variation from the approximate straight line L may be evaluated, for example, using the following expressions.

[Expression 1]

$$\left.\begin{array}{l}\sigma 1 = \sqrt{A11} + \sqrt{A12} \\ \sigma 2 = \sqrt{A21} + \sqrt{A22} \\ \sigma 3 = \sqrt{A31} + \sqrt{A32} \\ \sigma 4 = \sqrt{A41} + \sqrt{A42} \\ \sigma 5 = \sqrt{A51} + \sqrt{A52}\end{array}\right\} \quad (EQ1)$$

where σ1 may be the degree of variation from the approximate straight lines L11 and L12 when the temporary division is performed at the temporary division position POS1. The degree of variation σ1 may be the sum of the square root of the variance value V11 of the region on the left side of the temporary division position POS1 and the square root of the variance value V12 of the region on the right side of the temporary division position POS1. In other words, the degree of variation σ1 may be the sum of the standard deviation of the region on the left side of the temporary division position POS1 and the standard deviation of the region on the right side of the temporary division position POS1. Similarly, σ2 may be the degree of variation from the approximate straight lines L21 and L22 when the temporary division is performed at the temporary division position POS2; σ3 may be the degree of variation from the approximate straight lines L31 and L32 when the temporary division is performed at the temporary division position POS3; σ4 may be the degree of variation from the approximate straight lines L41 and L42 when the temporary division is performed at the temporary division position POS4; and σ5 may be the degree of variation from the approximate straight lines L51 and L52 when the temporary division is performed at the temporary division position POS5. The dividing processing unit 25 may select the temporary division position POS having the smallest degree of variation σ, among the degrees of variation σ1 to σ5. In the examples in FIGS. 9A to 9E, the dividing processing unit 25 may select the temporary division position POS4.

The dividing processing unit 25 may then estimate the position of a corner portion (a corner position CP) of a vehicle on the basis of the temporary division position POS selected in step S116 (step S117).

Figure 10:
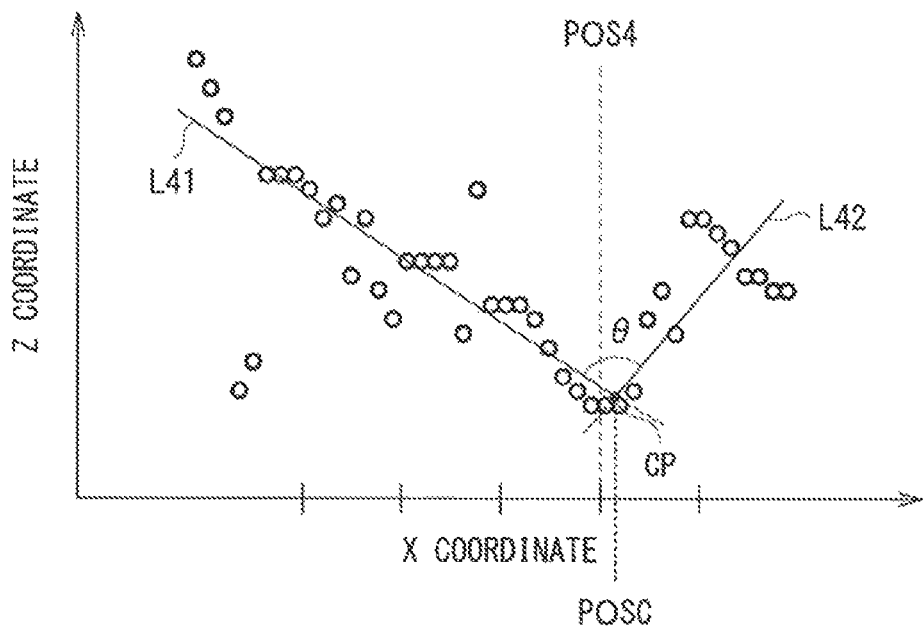
FIG. 10 is another diagram illustrating an operation example of the dividing processing unit illustrated in FIG. 1.

FIG. 10 illustrates an example of the process of step S117. In this example, the dividing processing unit 25 may extend the approximate straight line L41 of the region on the left side of the selected temporary division position POS4 into the region on the right side of the temporary division position POS4, and extend the approximate straight line L42 of the region on the right side of the selected temporary division position POS4 into the region on the left side of the temporary division position POS4. The intersection of the extended approximate straight line L41 and the extended approximate straight line L42 may correspond to the corner position CP. Since the horizontal axis corresponds to an x-axis in the width direction of the own vehicle 10, and the vertical axis corresponds to the z-axis in the length direction of the vehicle 10, the approximate straight line L41 may correspond to the side face 101 of the vehicle 9B illustrated in FIG. 4, and the approximate straight line L42 may correspond to the rear face 102 of the vehicle 9B in the x-z plane. Therefore, the intersection of the extended approximate straight line L41 and the extended approximate straight line L42 may correspond to the position of the corner portion 103 of the vehicle 9B. In this way, the dividing processing unit 25 may estimate the corner position CP.

The dividing processing unit 25 may then determine whether a predetermined dividing condition for dividing the image region R1 at the corner position CP estimated in step S117 is satisfied (step S118). The predetermined dividing condition may include, for example, the following five conditions. For example, if the five conditions are satisfied, the dividing processing unit 25 may determine that the predetermined dividing condition is satisfied.

The first condition may be that the x coordinate of the corner position CP estimated in step S117 corresponds to the x coordinate of the image region R1. That is, if the first condition is satisfied, it may be highly likely that the image region R1 contains an image of the corner portion. Therefore, the first condition may serve as a dividing condition.

The second condition may be that, when the image region R1 is divided at the x coordinate of the corner position CP, the variance value V representing the variance from the approximate straight line L is smaller than the variance value V0 calculated in step S112. That is, if the second condition is satisfied, the two image regions R (image regions R2 and R3) obtained by the division may be even more appropriately defined. Therefore, the second condition may serve as a dividing condition.

The third condition may be that the angle θ between the two approximate straight lines L used in step S117, as illustrated in FIG. 10, is within a predetermined angular range, including 90 degrees. Since the two approximate straight lines L respectively correspond to the side face and the rear face of the vehicle, the angle θ between the two approximate straight lines L may be expected to be approximately 90 degrees. If the third condition is satisfied, it may be highly likely that the image region R1 contains an image of the corner portion. Therefore, the third condition may serve as a dividing condition.

The fourth condition may be that, in the image region R1, the width of the region on the left side of the x coordinate of the corner position CP is larger than or equal to a predetermined width, and the width of the region on the right side of the x coordinate of the corner position CP is larger than or equal to a predetermined width. That is, if the fourth condition is satisfied, the two image regions R (image regions R2 and R3) defined by division may be larger than a certain size. Therefore, the fourth condition may serve as a dividing condition.

The fifth condition may be that the variance value V0 calculated in step S112 is larger than or equal to a predetermined value. That is, if the fifth condition is satisfied, the approximation with one approximate straight line L0 may be inappropriate. In other words, it may be highly likely that the image region R1 contains an image of the corner portion. Therefore, the fifth condition may serve as a dividing condition.

If such conditions are all satisfied, the dividing processing unit 25 may determine that the predetermined dividing condition is satisfied. In other words, the dividing processing unit 25 may determine that the image region R1 contains an image of the corner portion.

If the predetermined dividing condition is not satisfied in step S118 (step S118: NO), the process may end. If the predetermined dividing condition is satisfied (step S118: YES), the dividing processing unit 25 may establish the x coordinate of the corner position CP estimated in step S117 as a division position POSC. At the division position POSC, the image region R1 may be divided into two image regions R2 and R3 (step S119).

The dividing process A1 may then end. The dividing processing unit 25 may sequentially select target image regions R1 among the multiple image regions R and perform the dividing process A1 on each selected image region R1.

If the image region R1 contains an image of a corner portion of a vehicle, as illustrated in FIG. 4, the predetermined dividing condition may be satisfied (step S118: YES). Therefore, the dividing processing unit 25 of the image processing apparatus 1 may divide the image region R1 into an image region R2 containing an image of the side face of the vehicle and an image region R3 containing an image of the rear face of the vehicle. In this way, the image processing apparatus 1 may separately define the image region R2 containing an image of the side face of the vehicle and the image region R3 containing an image of the rear face of the vehicle. This may allow the image processing apparatus 1 to separately recognize the side face and the rear face of the vehicle.

Joining Process B1

The joining process B1 of the region joining process B of step S106 illustrated in FIG. 5 will now be explained in detail.

In the joining process B1, the joining processing unit 26 may join two image regions (image region R4 an R5) into one image region R (an image region R6) when a section of a three-dimensional real space corresponding to an image in the image region R4 is disposed close to a section of the three-dimensional real space corresponding to an image in the image region R5. The joining processing unit 26 may determine whether a temporarily joined region including, for example, the two image regions R4 and R5 contains an image of a corner portion of a vehicle. If the temporarily joined region contains the image of the corner portion, the joining processing unit 26 may refrain from joining the two image regions R4 and R5.

Figure 11:
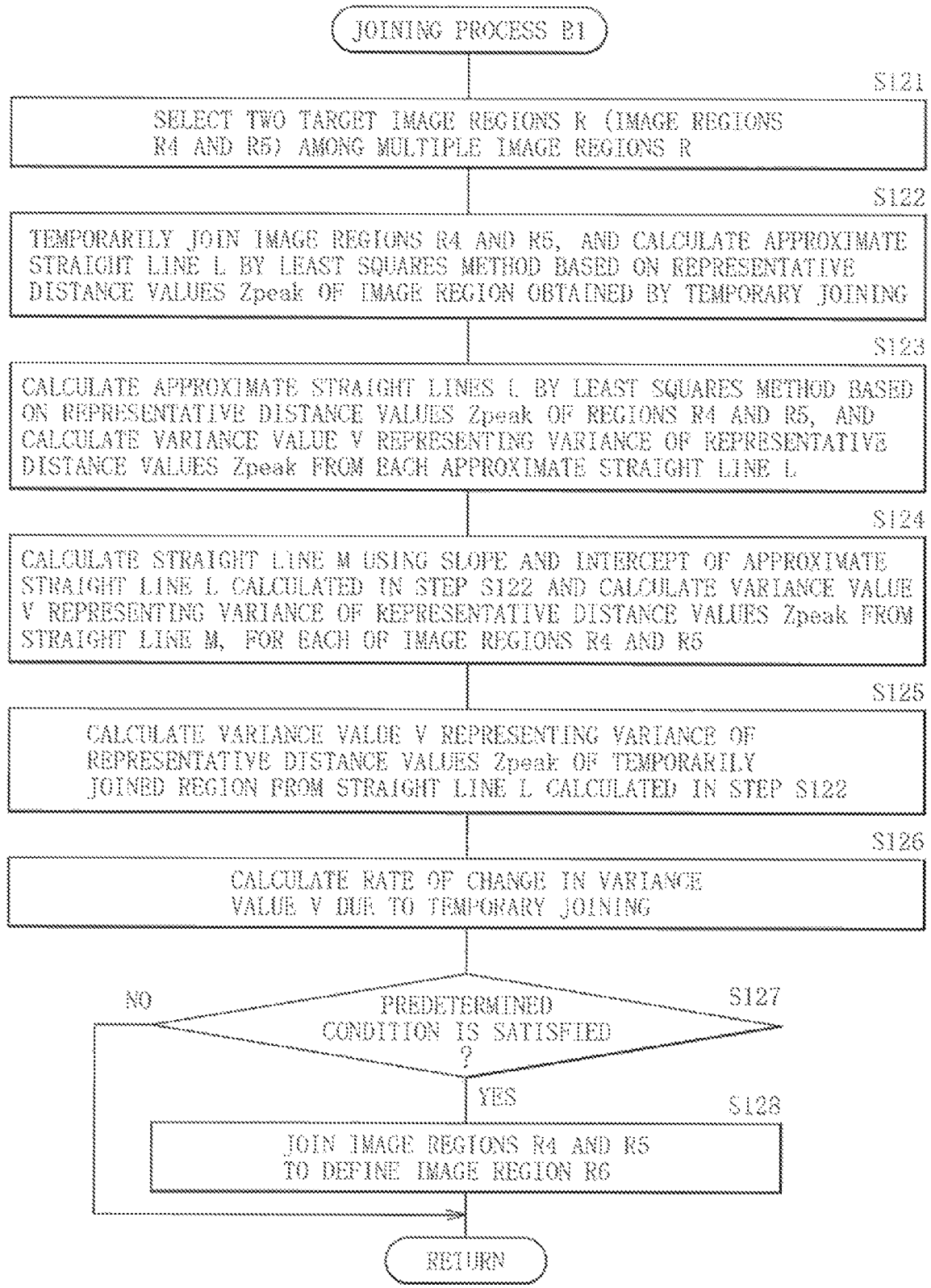
FIG. 11 is a flowchart illustrating an example of a joining process performed by the joining processing unit illustrated in FIG. 1.

FIG. 11 illustrates an example of the joining process B1.

The joining processing unit 26 may first select two target image regions R (image regions R4 and R5) among multiple image regions R (step S121). For example, the two image regions R4 and R5 selected from the multiple image regions R by the joining processing unit 26 may be disposed at a distance smaller than a predetermined distance from each other in the three-dimensional real space corresponding to the images in the image regions R4 and R5.

The joining processing unit 26 may then temporarily join the image regions R4 and R5 and calculate an approximate straight line L by the least squares method on the basis of the representative distance values Zpeak of the temporarily joined region (step S122).

Figure 12:
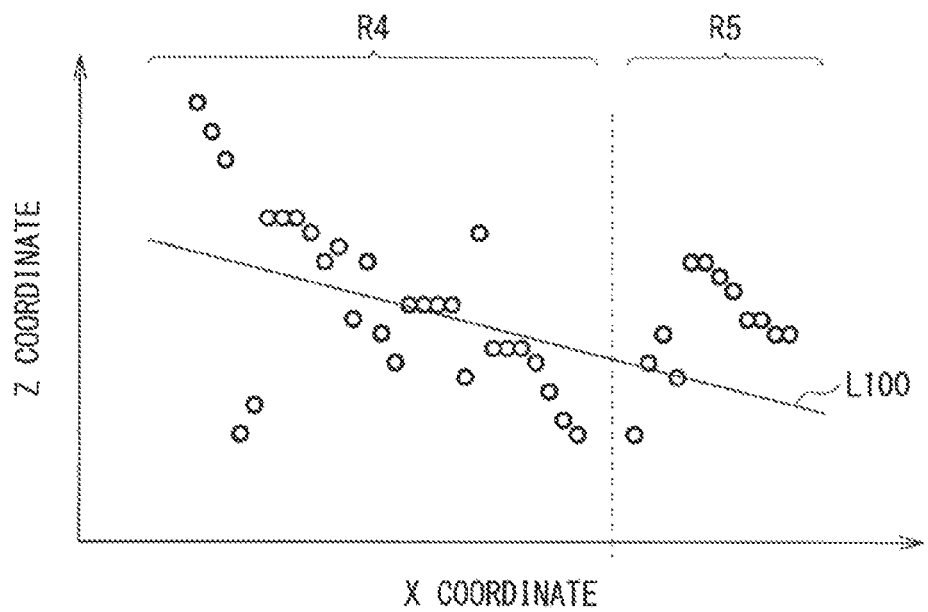
FIG. 12 is a diagram illustrating an operation example of the joining processing unit illustrated in FIG. 1.

FIG. 12 illustrates an example of the process of step S122. FIG. 12 plots coordinate points corresponding to the multiple representative distance values Zpeak of multiple columns of pixels belonging to the image regions R4 and R5 in the x-z coordinate plane. The joining processing unit 26 may calculate an approximate straight line L100 by the least squares method on the basis of the representative distance values Zpeak.

The joining processing unit 26 may then calculate approximate straight lines L by the least squares method on the basis of the representative distance values Zpeak in the image regions R4 and R5 and calculate variance values V representing variances of the representative distance values Zpeak from the approximate straight lines L (step S123).

Figure 13:
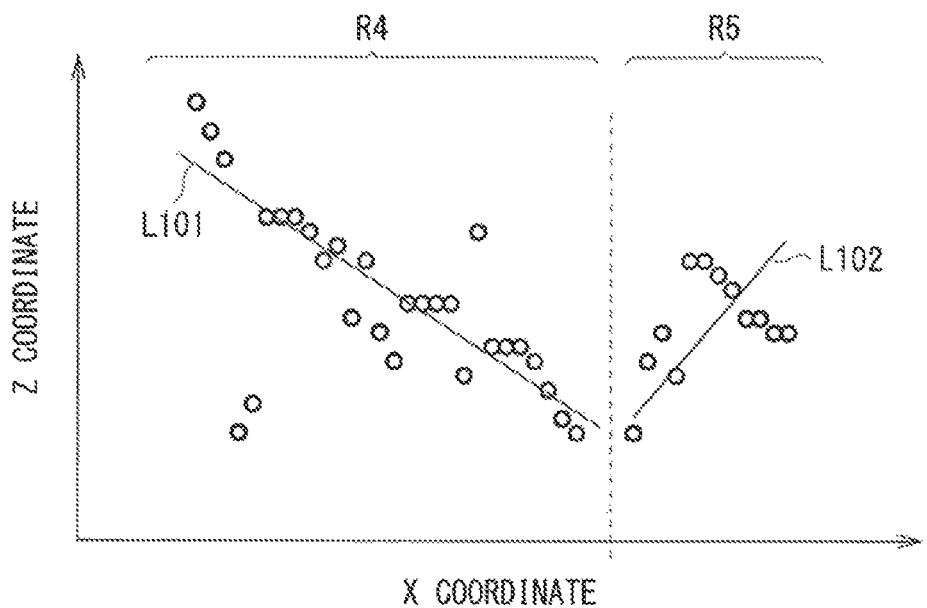
FIG. 13 is another diagram illustrating an operation example of the joining processing unit illustrated in FIG. 1.

FIG. 13 illustrates an example of the process of step S123. The joining processing unit 26 may calculate an approximate straight line L101 by the least squares method on the basis of the representative distance values Zpeak of the image region R4 and calculate a variance value V101 representing the variance of the representative distance values Zpeak from the approximate straight line L101. Similarly, the joining processing unit 26 may calculate an approximate straight line L102 by the least squares method on the basis of the representative distance values Zpeak of the image region R5 and calculate a variance value V102 representing the variance of the representative distance values Zpeak from the approximate straight line L102.

The joining processing unit 26 may then calculate a straight line M using the slope and the intercept of the approximate straight line L calculated in step S122 and calculate a variance value V representing the variance of the representative distance values Zpeak from the straight line M, for each of the image regions R4 and R5 (step S124).

Figure 14:
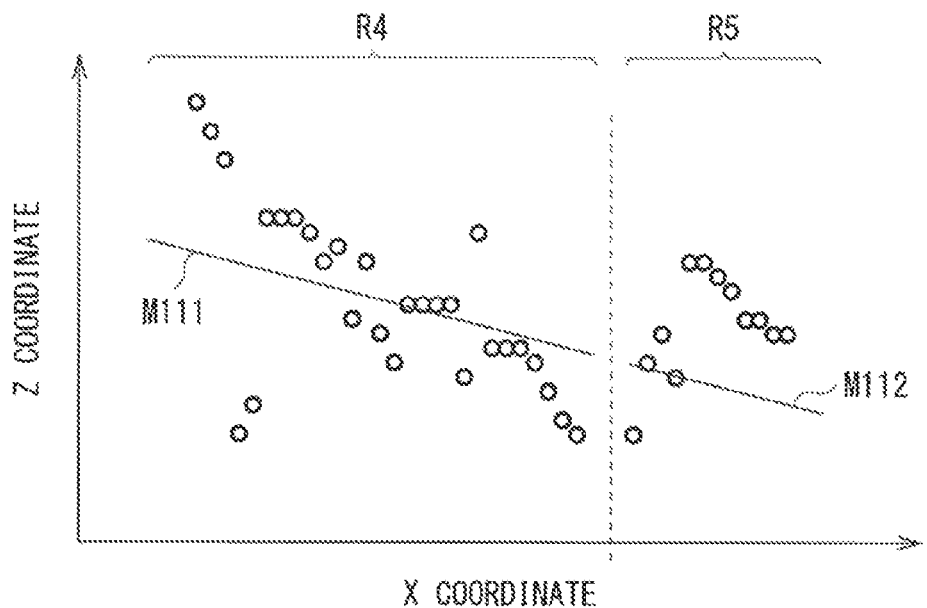
FIG. 14 is another diagram illustrating an operation example of the joining processing unit illustrated in FIG. 1.

FIG. 14 illustrates an example of the process of step S124. The joining processing unit 26 may calculate a straight line M111 using the slope and the intercept of the approximate straight line L calculated in step S122 and calculate a variance value V111 representing the variance of the representative distance values Zpeak of the image region R4 from the straight line M111. The variance value V111 may be the variance value V representing the variance of the representative distance values Zpeak of the image region R4 from the approximate straight line L100. Similarly, the joining processing unit 26 may calculate a straight line M112 using the slope and the intercept of the approximate straight line L calculated in step S122 and calculate a variance value V112 representing the variance of the representative distance values Zpeak of the image region R5 from the straight line M112. The variance value V112 may be the variance value V representing the variance of the representative distance values Zpeak of the image region R5 from the approximate straight line L100.

The joining processing unit 26 may then calculate a variance value V representing the variance of the representative distance values Zpeak of the temporarily joined region from the straight line L calculated in step S122 (step S125).

Figure 15:
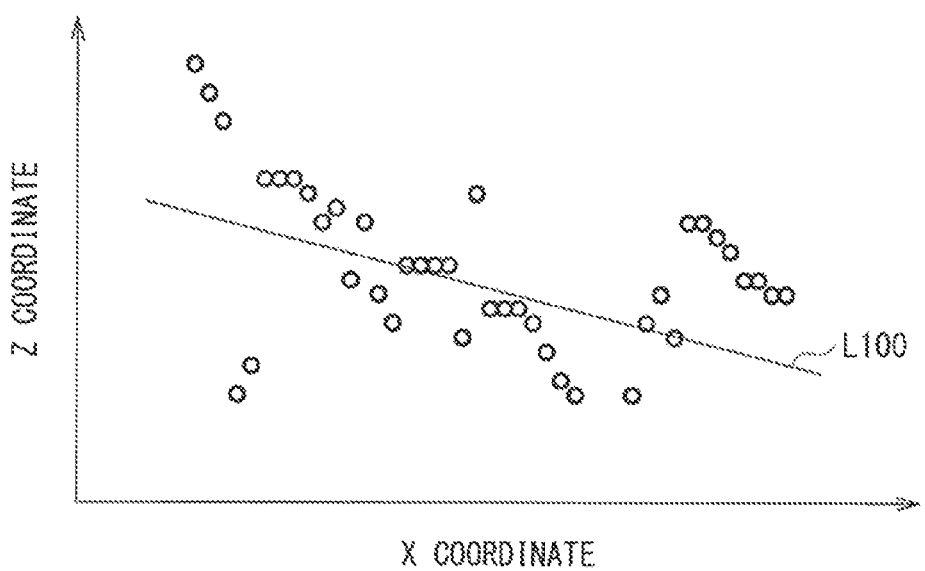
FIG. 15 is another diagram illustrating an operation example of the joining processing unit illustrated in FIG. 1.

FIG. 15 illustrates an example of the process of step S125. The joining processing unit 26 may calculate a variance value V100 representing the variance of the representative distance values Zpeak of the temporarily joined region from the approximate straight line L100 calculated in step S122.

The joining processing unit 26 may then calculate the rate of change in the variance value V caused by the temporary joining (step S126). The rate of change in the variance value V may include, for example, the following three types of rate of change.

The first rate of change may be the rate of change in the variance value V of the entire region caused by the temporary joining. For example, the first rate of change may be, for example, the rate of change from the sum of the variance value V101 of the image region R4 and the variance value V102 of the image region R5 (FIG. 13) to the variance value V100 of the temporarily joined region (FIG. 15).

The second rate of change may be the rate of change in the variance value V of the image region R4 caused by the temporary joining. For example, the second rate of change may be, for example, the rate of change from the variance value V101 representing the variance from the approximate straight line L101 of the image region R4 (FIG. 13) to the variance value V111 representing the variance from the straight line M111 of the image region R4 (FIG. 14).

The third rate of change may be the rate of change in the variance value V of the image region R5 caused by the temporary joining. For example, the third rate of change may be, for example, the rate of change from the variance value V102 representing the variance from the approximate straight line L102 of the image region R5 (FIG. 13) to the variance value V112 representing the variance from the straight line M112 of the image region R5 (FIG. 14).

The joining processing unit 26 may then determine whether a predetermined joining condition for joining the image regions R4 and R5 is satisfied (step S127). The predetermined joining condition may include, for example, the following three conditions. For example, if the three conditions are satisfied, the joining processing unit 26 may determine that the predetermined joining condition is satisfied. The first condition may be that the first rate of change is smaller than a predetermined first threshold value. The second condition may be that the second rate of change is smaller than a predetermined second threshold value. The third condition may be that the third rate of change is smaller than a predetermined third threshold value. The joining processing unit 26 may determine whether all conditions are satisfied so as to determine whether the predetermined joining condition is satisfied.

If the predetermined joining condition is not satisfied in step S127 (step S127: NO), the process may end. If the predetermined joining condition is satisfied (step S127: YES), the joining processing unit 26 may define an image region R6 by joining the image regions R4 and R5 (step S128).

The joining process B1 may then end. The joining processing unit 26 may sequentially select two target image regions R4 and R5, and perform the joining process B1 on the selected image regions R4 and R5.

If an image region R1 contains an image of a corner portion of a vehicle, for example, as explained in the dividing process A1 illustrated in FIG. 7, the image processing apparatus 1 may divide the image region R1 into an image region R2 containing an image of a side face of the vehicle and an image region R3 containing an image of the rear face of the vehicle. In such a case, joining the image regions R2 and R3 in the joining process B1 can cause the variance value V to be too large to satisfy a predetermined joining condition (step S127: NO). Thus, the joining processing unit 26 may refrain from joining the image regions R2 and R3. The predetermined joining condition may be a condition that a temporarily joined region does not contain an image of a corner portion of a vehicle. Since the predetermined joining condition is not satisfied in the example of the image regions R2 and R3, the temporarily joined region may so be determined as to contain an image of a corner portion of a vehicle. Thus, the joining processing unit 26 may refrain from joining the image regions R2 and R3. In this way, the image processing apparatus 1 may prevent the image regions R2 and R3 defined by division in the dividing process A1 from being joined in the joining process B1.

Joining Process B2

The joining process B2 of the region joining process B of step S106 illustrated in FIG. 5 will now be explained in detail.

In the joining process B2, the joining processing unit 26 may determine whether two image regions R (image regions R7 and R8) disposed apart from each other contain images of different portions of a side face of the same vehicle. When the image regions R7 and R8 contain images of different portions of the side face of the same vehicle, the joining processing unit 26 may define an image region R9 by joining the image regions R7 and R8.

Figure 16A:
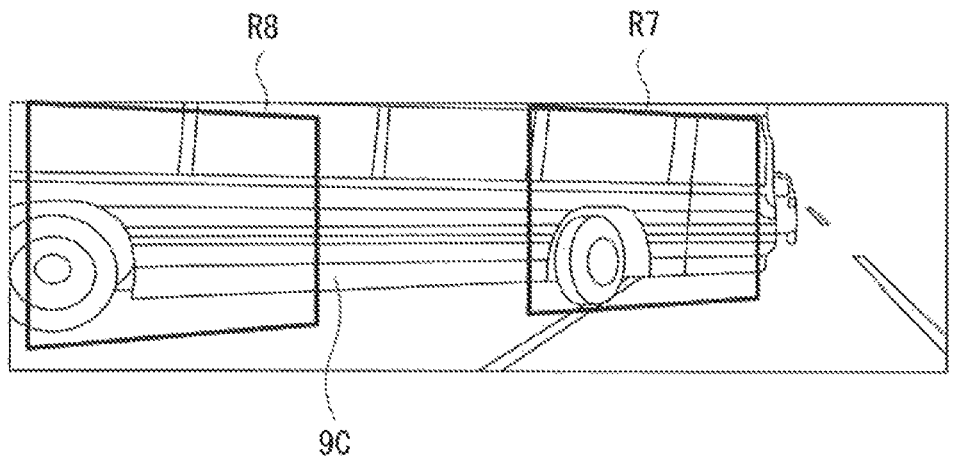
FIG. 16A is another image diagram illustrating an operation example of the processor illustrated in FIG. 1.
Figure 16B:
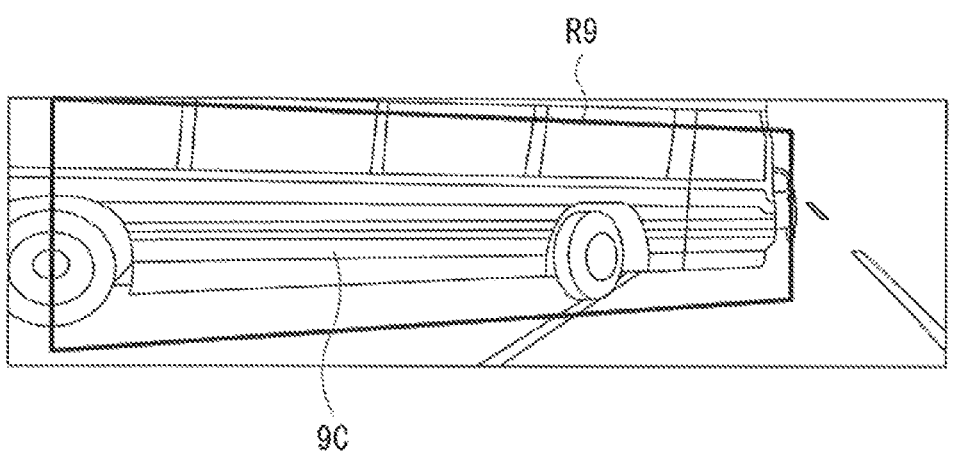
FIG. 16B is another image diagram illustrating an operation example of the processor illustrated in FIG. 1.

FIG. 16A illustrates examples of the image regions R7 and R8. FIG. 16B illustrates an example of the image region R9 defined by joining the image regions R7 and R8 in the joining process B2. In this example, the left image PL of the stereo images PIC may contain an image of a vehicle 9C in front of the own vehicle 10. Note that this example will be described with reference to the left image PL, but the description may also apply to the right image PR or the distance image PZ.

The vehicle 9C may be a vehicle having a large vehicle length. In this example, the vehicle 9C may be a bus. The vehicle 9C may be cutting in front of the vehicle 10 from the side. The vehicle 9C may be oriented in a direction at an angle to the extending direction of the road. Therefore, the left image PL may contain an image of a side face of the vehicle 9C. It may be desirable that the image-region defining unit 23 define one image region R on the side face of the vehicle 9C. However, it may be difficult for the distance-image generating unit 21 to generate a highly accurate distance image PZ of the side face of a bus, for example, because pattern matching is difficult. For example, it may be difficult for the distance-image generating unit 21 to calculate an z coordinate value, for example, near the center of the side face of a bus. This may lead to an insufficient number of data items to be supplied to the representative-distance calculating unit 22 for the generation of histograms H of columns of pixels corresponding to a portion of the side face near the center of the bus in the distance image PZ. In such a case, it may be difficult for the representative-distance calculating unit 22 to calculate representative distance values Zpeak. Therefore, the representative-distance values Zpeak may be missing in columns of pixels corresponding to a portion of the side face near the center of the bus. As a result, the image-region defining unit 23 may define two image regions R7 and R8 on the side face of the vehicle 9C, as illustrated in FIG. 16A.

In the joining process B2, the joining processing unit 26 may determine that the two image regions R7 and R8 contain images of different portions of the side face of the same vehicle. The joining processing unit 26 may then join the image regions R7 and R8 to define an image region R9, as illustrated in FIG. 16B. In this way, the processor 20 may recognize the side face of the vehicle 9C as a single object.

Figure 17A:
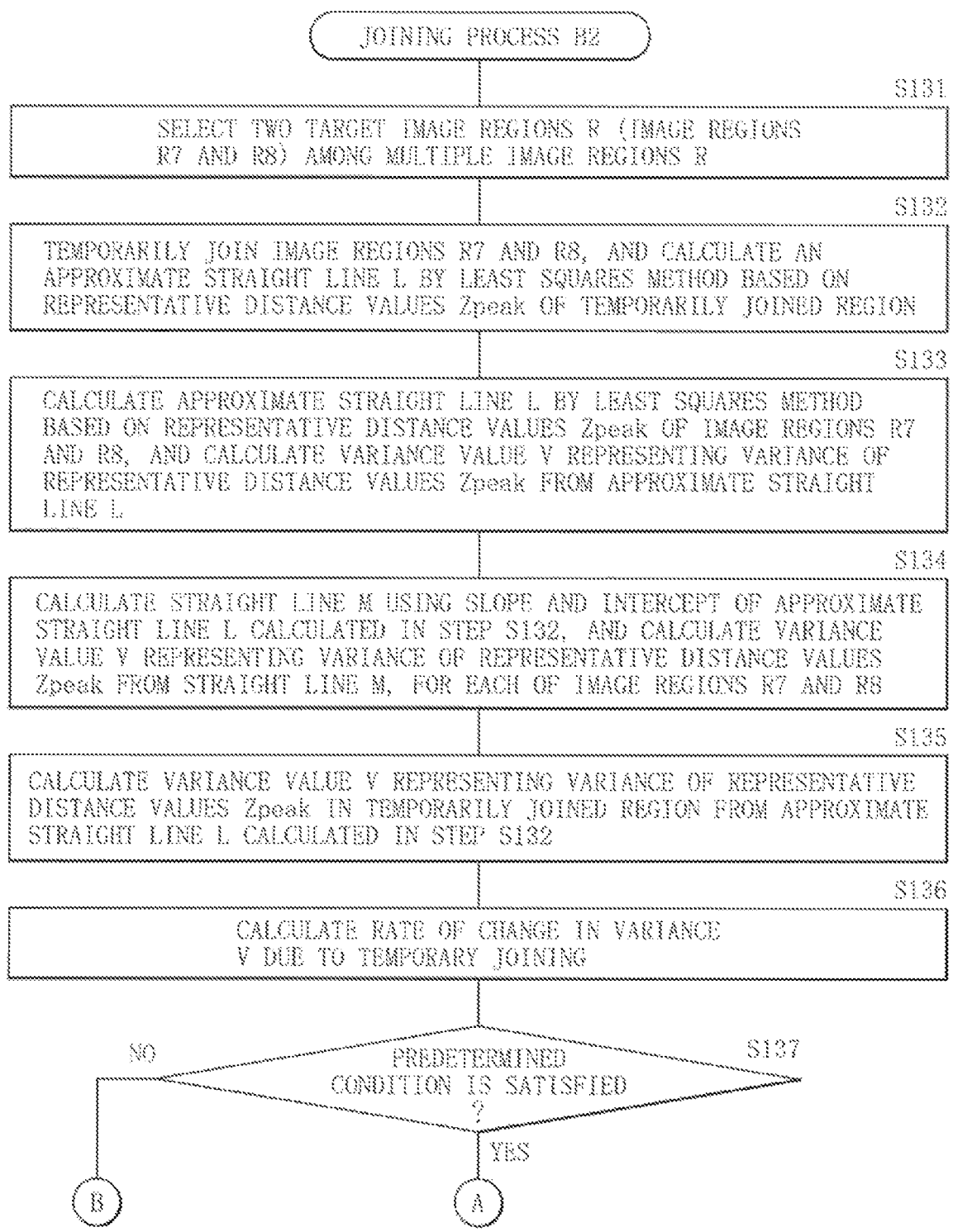
FIG. 17A is a flowchart illustrating an example of another joining process performed by the joining processing unit illustrated in FIG. 1.
Figure 17B:
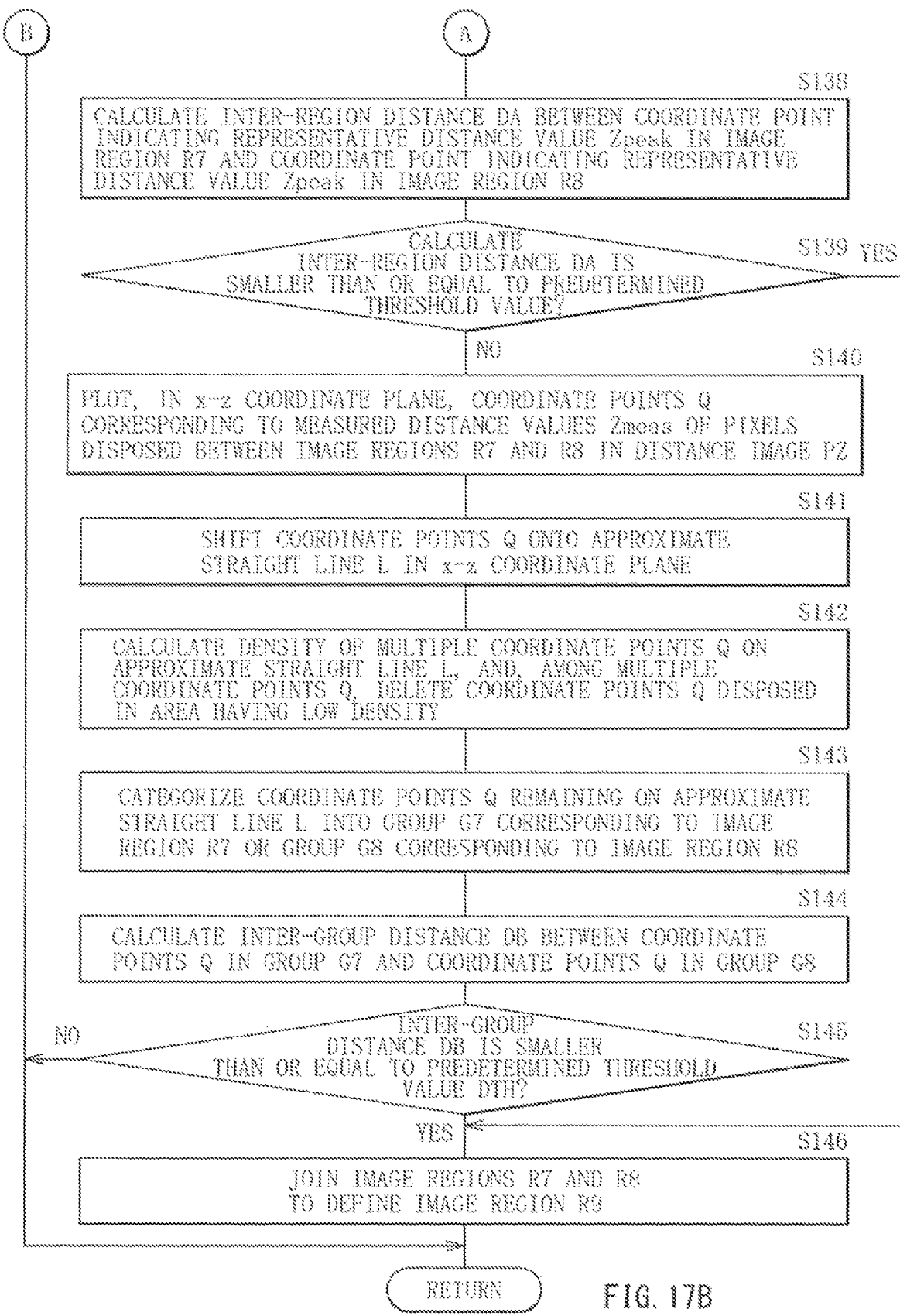
FIG. 17B is another flowchart illustrating an example of another joining process performed by the joining processing unit illustrated in FIG. 1.

FIGS. 17A and 17B illustrate an example of the joining process B2. Steps S132 to S137 in the joining process B2 may be the same as steps S122 to S127 in the joining process B1 as illustrated in FIG. 11.

The joining processing unit 26 may first select two target image regions R (image regions R7 and R8) among multiple image regions R (step S131). The joining processing unit 26 may sequentially select two image regions R in the direction from the left edge to the center of the distance image PZ and sequentially select two image regions R from the right edge to the center of the distance image PZ. Then, once again, the joining processing unit 26 may sequentially select two image regions R in the direction from the left edge to the center of the distance image PZ and sequentially select two image regions R from the right edge to the center of the distance image PZ.

The joining processing unit 26 may then temporarily join the image regions R7 and R8 and calculate an approximate straight line L by the least squares method on the basis of the representative distance values Zpeak of the temporarily joined region (step S132).

Figure 18:
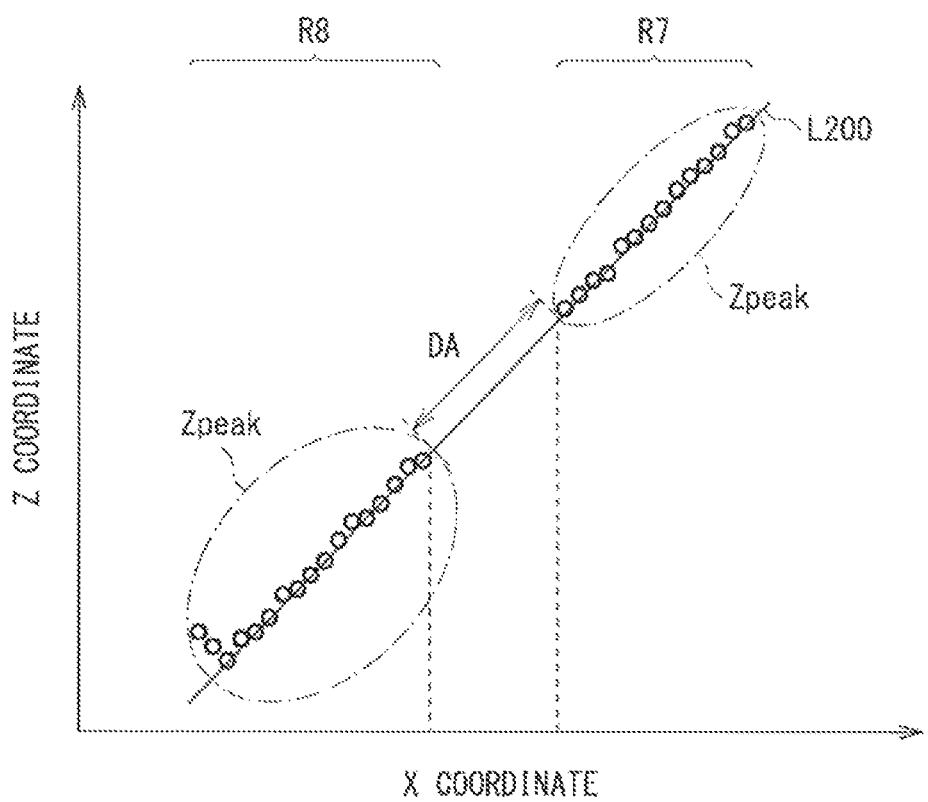
FIG. 18 is another diagram illustrating an operation example of the joining processing unit illustrated in FIG. 1.

FIG. 18 illustrates an example of the process of step S132. FIG. 18 plots coordinate points corresponding to multiple representative distance values Zpeak of multiple columns of pixels belonging to the image regions R7 and R8 in the x-z coordinate plane. The joining processing unit 26 may calculate an approximate straight line L200 by the least squares method on the basis of the coordinate points.

The joining processing unit 26 may then calculate an approximate straight line L by the least squares method on the basis of the representative distance values Zpeak of the image regions R7 and R8 and calculate a variance value V representing the variance of the representative distance values Zpeak from the approximate straight line L (step S133).

The joining processing unit 26 may then calculate a straight line M using the slope and the intercept of the approximate straight line L calculated in step S132 and calculate a variance value V representing the variance of the representative distance values Zpeak from the straight line M, for each of the image regions R7 and R8 (step S134).

The joining processing unit 26 may then calculate a variance value V representing the variance of the representative distance values Zpeak in a temporarily joined region from the approximate straight line L calculated in step S132 (step S135).

The joining processing unit 26 may then calculate the rate of change in the variance V caused by the temporary joining (step S136).

The joining processing unit 26 may then determine whether a predetermined joining condition for joining the image regions R7 and R8 is satisfied (step S137). If the predetermined joining condition is not satisfied in step S137 (step S137: NO), the process may end.

If the predetermined joining condition is satisfied in step S137 (step S137: YES), the joining processing unit 26 may calculate an inter-region distance DA between a coordinate point indicating a representative distance value Zpeak in the image region R7 and a coordinate point indicating a representative distance value Zpeak in the image region R8 (step S138). For example, the joining processing unit 26 may calculate the inter-region distance DA along the approximate straight line L200 between two coordinate points among the coordinate points corresponding to representative-distance values Zpeak of the image regions R7 and R8 in the x-z coordinate plane, as illustrated in FIG. 18. One of the two coordinate points may be of the image region R7 and disposed closest to the image region R8. The other one of the two coordinate point may be of the image region R8 and disposed closest to the image region R7.

The joining processing unit 26 may then confirm whether the inter-region distance DA is smaller than or equal to a predetermined threshold value Dth (step S139). If the inter-region distance DA is smaller than or equal to the predetermined threshold value Dth (step S139: YES), the process may proceed to step S146.

If the inter-region distance DA is not smaller than or equal to the predetermined threshold value Dth in step S139 (step S139: NO), the joining processing unit 26 may plot coordinate points Q in the x-z coordinate plane (step S140). The coordinate points Q may correspond to measured distance values Zmeas of pixels P disposed between the image regions R7 and R8, among the measured distance values Zmeas of all pixels P in the distance image PZ.

Figure 19:
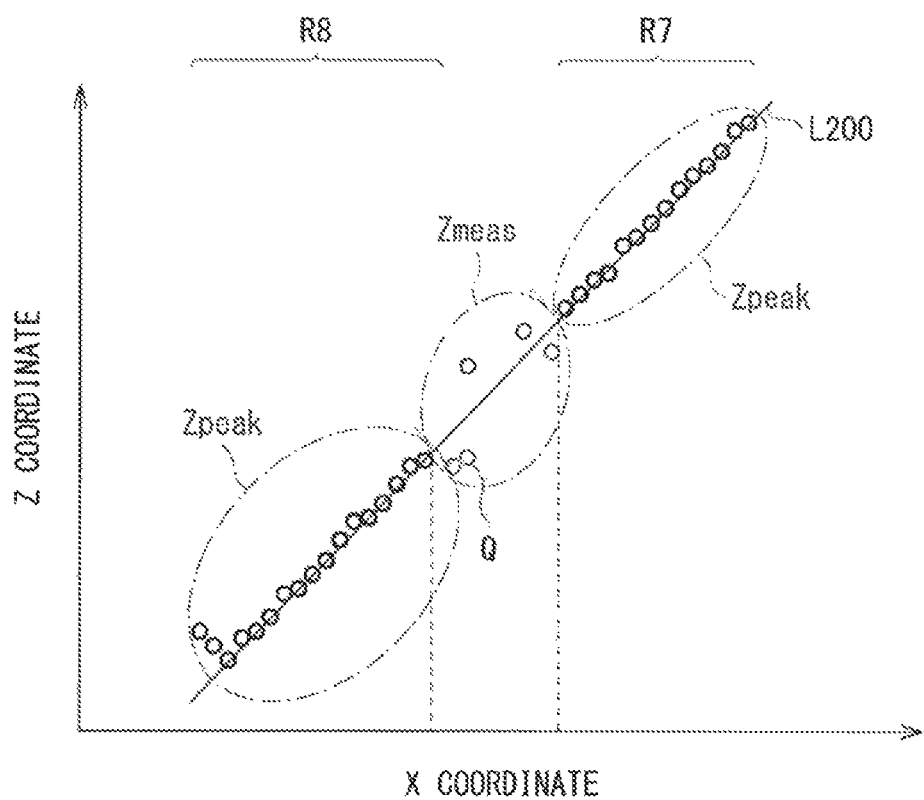
FIG. 19 is another diagram illustrating an operation example of the joining processing unit illustrated in FIG. 1.

FIG. 19 illustrates an example of the process of step S140. In this example, five coordinate points Q may be plotted on the basis of the measured distance values Zmeas of the pixels P disposed between the image regions R7 and R8. Note that in this example, five coordinate points Q are plotted for the purpose of illustration. Actually, more coordinate points Q may be plotted. Since the coordinate points Q correspond to the measured distance values Zmeas generated by the distance-image generating unit 21, the coordinate points Q may be plotted slightly away from the approximate straight line L200, as illustrated in FIG. 19.

The joining processing unit 26 may then shift the coordinate points Q plotted in step S140 in the x-z coordinate plane onto the approximate straight line L calculated in step S132 (step S141).

Figure 20:
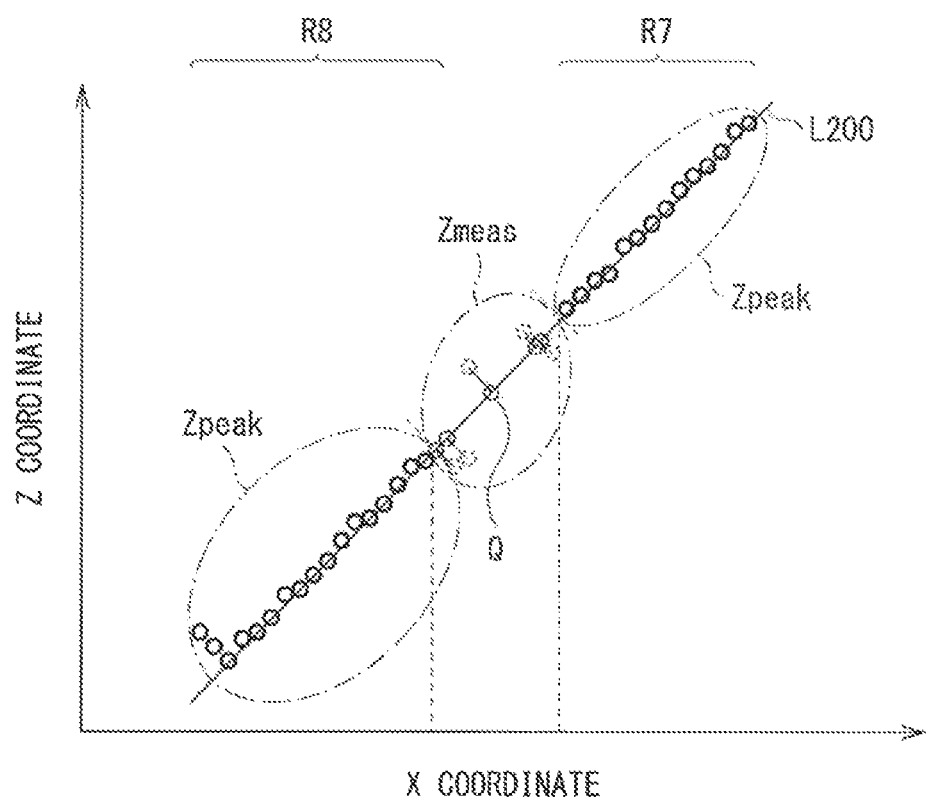
FIG. 20 is another diagram illustrating an operation example of the joining processing unit illustrated in FIG. 1.

FIG. 20 illustrates an example of the process of step S141. In this example, the joining processing unit 26 may shift the coordinate points Q plotted in step S140 toward the approximate straight line L200 in a direction orthogonal to the approximate straight line L200. As a result, the shifted coordinate points Q may be disposed on the approximate straight line L200.

The joining processing unit 26 may then calculate the density of the multiple coordinate points Q on the approximate straight line L and, among the multiple coordinate points Q, delete the coordinate points Q disposed in an area having a low density (step S142).

Figure 21:
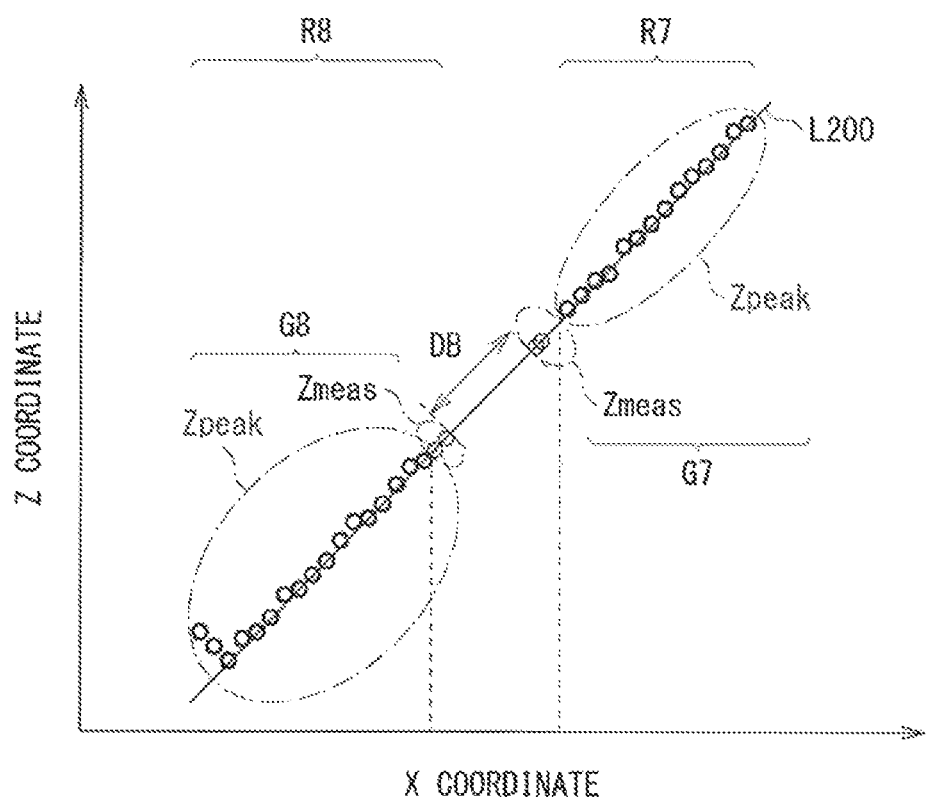
FIG. 21 is another diagram illustrating an operation example of the joining processing unit illustrated in FIG. 1.

FIG. 21 illustrates an example of the process of step S142. In this example, the coordinate point Q disposed at the middle among the five coordinate points Q that have been shifted onto the approximate straight line L200 in step S141 may be disposed in an area having a low density. Therefore, the joining processing unit 26 may delete this coordinate point Q.

The joining processing unit 26 may then categorize the coordinate points Q remaining on the approximate straight line L among the multiple coordinate points Q into a group G7 corresponding to the image region R7 and a group G8 corresponding to the image region R8 (step S143).

The joining processing unit 26 may then calculate an inter-group distance DB between one of the coordinate points Q in the group G7 and one of the coordinate points Q in the group G8 along the approximate straight line L (step S144). For example, the joining processing unit 26 may calculate the inter-group distance DB between a coordinate point Q in the group G7 closest to the group G8 and a coordinate point Q in the group G8 closest to the group G7 along the approximate straight line L200 in the x-z coordinate plane, as illustrated in FIG. 21.

The joining processing unit 26 may then confirm whether the inter-group distance DB is smaller than or equal to a predetermined threshold value Dth (step S145). If the inter-group distance DB is not smaller than or equal to the predetermined threshold value Dth (step S145: NO), the process may end.

The joining processing unit 26 may then join the image regions R7 and R8 to define an image region R9 (step S146).

The joining process B2 may then end. The joining processing unit 26 may sequentially select two target image regions R7 and R8 and perform the joining process B2 on the selected image regions R7 and R8.

If the image regions R7 and R8 disposed apart from each other contain images of different portions of the side face of the same vehicle, as illustrated in FIG. 16A, the image processing apparatus 1 may keep the variance value V relatively small even when the image regions R7 and R8 are joined. Therefore, the predetermined joining condition may be satisfied (step S137: YES). In such a case, for example, if the portion of the side face of the vehicle in the image in the image region R7 and the portion of the side face of the vehicle in the image in the image region R8 are close to each other, the inter-region distance DA may be smaller than or equal to the predetermined threshold value Dth (step S139: YES). Therefore, the joining processing unit 26 may join the image regions R7 and R8 to define the image region R9. In contrast, if the portion of the side face of the vehicle in the image in the image region R7 and the portion of the side face of the vehicle in the image in the image region R8 are relatively far apart from each other, the inter-region distance DA may be larger than the predetermined threshold value Dth (step S139: NO). Even in such a case, the measured distance values Zmeas of pixels P disposed between the image regions R7 and R8 may be used to calculate the inter-group distance DB. If the calculated inter-group distance DB is smaller than or equal to a predetermined threshold value Dth (step S145: YES), the two image regions R7 and R8 may be joined to define the image region R9. In this way, the image processing apparatus 1 may define one image region R9 on the side face of a vehicle to recognize the side face of the vehicle as a single object.

In one embodiment, the approximate straight line L200 may serve as an "approximate straight line". In one embodiment, the group G7 and the group G8 may respectively serve as a "first group" and a "second group". In one embodiment, the inter-group distance DB may serve as a "first distance". In one embodiment, the inter-region distance DA may serve as a "second distance". In one embodiment, the threshold value Dth may serve as a "predetermined distance".

As explained above, the dividing processing unit 25 of the image processing apparatus 1 determines whether an image region R1 contains an image of a corner portion of a vehicle on the basis of multiple representative distance values Zpeak of multiple columns of pixels belonging to the image region R1. If the image region R1 contains the image of the corner portion, a dividing process based on the corner portion may be performed to define two image regions R2 and R3. Since the image processing apparatus 1 respectively defines the image region R2 containing an image of the side face of the vehicle and the image region R3 containing an image of the side face and the rear face of the vehicle, the side face and the rear face of the vehicle may be recognized separately. In this way, the image processing apparatus 1 defines image regions R appropriately.

For example, the dividing processing unit 25 of the image processing apparatus 1 may define a temporary division position POS in an image region R1. In the example illustrated in FIG. 10, the temporary division position POS may be a temporary division position POS4. The dividing processing unit 25 may then categorize the representative distance values Zpeak into a group on the left side of the temporary division position POS and a group on the right side of the temporary division position POS. The dividing processing unit 25 may then generate an approximate straight line L, which is an approximate straight line L41 in this example, on the basis of the representative distance values Zpeak categorized into the group on the left side of the temporary division position POS. The dividing processing unit 25 may also generate an approximate straight line L, which is an approximate straight line L42 in this example, on the basis of the representative distance values Zpeak categorized into the group on the right side of the temporary division position POS. The dividing processing unit 25 may then define a division position POSC on the basis of the approximate straight lines L. In this way, the image processing apparatus 1 may accurately define a division position POSC.

The joining processing unit 26 of the image processing apparatus 1 may determine whether the region (temporarily joined region) obtained by temporarily joining image regions R4 and R5 contains an image of a corner portion of a vehicle. If the temporarily joined region contains the image of the corner portion, the joining processing unit 26 may refrain from joining the two image regions R4 and R5. Since the image processing apparatus 1 does not join the two image regions R4 and R5, for example, when the image region R4 contains an image of the side face of a vehicle and the image region R5 contains an image of the rear face of the vehicle, the image processing apparatus 1 may separately recognize the side face and the rear face of the vehicle. In this way, the image processing apparatus 1 may define image regions R appropriately.

For example, the joining processing unit 26 of the image processing apparatus 1 may generate the approximate straight line L101 on the basis of the multiple representative distance values Zpeak of the multiple columns of pixels belonging to the image region R4, as illustrated in FIG. 13, and calculate the variance value V101 representing the variance of the representative distance values from the approximate straight line L101. Similarly, the joining processing unit 26 may generate the approximate straight line L102 on the basis of the multiple representative distance values Zpeak of the multiple columns of pixels belonging to the image region R5 and calculate the variance value V102 representing the variance of the representative distance values Zpeak from the approximate straight line L102. The joining processing unit 26 may then determine whether the temporarily joined region contains an image of a corner portion of a vehicle on the basis of the variance values V. In this way, the image processing apparatus 1 may determine that the temporarily joined region contains an image of a corner portion of a vehicle when the variance values V increase as a result of the temporary joining. This may prevent the two image regions R4 and R5 from being joined.

The joining processing unit 26 of the image processing apparatus 1 may determine whether the image regions R7 and R8 each contain an image of the side face of the same vehicle. If the image regions R7 and R8 each contain the image of the side face of the same vehicle, the joining processing unit 26 may join the two image regions R7 and R8. Since the image processing apparatus 1 is able to join the two image regions R7 and R8, for example, when the image region R7 contains an image of the front portion of the side face of the vehicle and the image region R8 contains an image of the rear portion of the side face of the vehicle, the image processing apparatus 1 may recognize the side face of the vehicle as a single object. In this way, the image processing apparatus 1 may define image regions R appropriately.

For example, as illustrated in FIG. 21, the joining processing unit 26 of the image processing apparatus 1 may determine whether the image regions R7 and R8 each contain an image of the side face of the same vehicle on the basis of multiple representative distance values Zpeak of multiple columns of pixels belonging to the image region R7, multiple representative distance values Zpeak of multiple columns of pixels belonging to the image region R8, and measured distance values Zmeas corresponding to the pixels P disposed between the image regions R7 and R8. In this way, the image processing apparatus 1 may readily determine that the image regions R7 and R8 each contain an image of the side face of the same vehicle by using the measured distance values Zmeas even when the representative distance values Zpeak are missing in columns of pixels corresponding to, for example, the central portion of the side face of the bus. Therefore, the image processing apparatus 1 may readily join the two image regions R7 and R8.

In this way, the image processing apparatus 1 may be able to define an image region appropriately. The image processing apparatus 1 is thereby able to accurately perform traveling control of, for example, the own vehicle 10 on the basis of the recognition result or to display more accurate information on the recognized object on the console monitor.

Effects

In at least one of the embodiments described above, whether an image region R1 contains an image of a corner portion of a vehicle is determined on the basis of multiple representative distance values of multiple columns of pixels belonging to the image region R1. If the image region R1 contains the image of the corner portion, two image regions R2 and R3 may be defined by performing a dividing process on the basis of the corner portion. In this way, the image regions R2 and R3 may be defined to respectively contain the side face and the rear face of the same vehicle. Therefore, it is possible to define the image regions appropriately.

In at least one of the embodiments described above, whether a temporarily joined region obtained by temporarily joining image regions R4 and R5 contains an image of a corner portion of a vehicle may be determined. If the temporarily joined region contains the image of the corner portion, the two image regions R4 and R5 may be refrained from being joined. For example, if the image region R4 contains an image of the side face of a vehicle and the image region R5 contains an image of the rear face of the same vehicle, the two image regions R4 and R5 may be refrained from being joined. Therefore, it is possible to define image regions appropriately.

In at least one of the embodiments described above, whether the image regions R7 and R8 each contain an image of a side face of the same vehicle may be determined. If the image regions R7 and R8 each contain the image of the side face of the same vehicle, the two image regions R7 and R8 may be joined. In this way, for example, if the image region R7 contains an image of the front portion of the side face of the vehicle and the image region R8 contains an image of the rear portion of the side face of the same vehicle, the two image regions R7 and R8 may be joined. Therefore, it is possible to define image regions appropriately.

Although the technology has been described with reference to example embodiments, the technology is not limited to the example embodiments described above and is modifiable in a variety of ways.

For example, in an embodiment described above, the stereo cameras 11 may capture images in the forward direction from the vehicle 10. However, the direction of image capturing is not limited to the forward direction, and alternatively, images may be captured, for example, in the sideward or rearward direction.

According to an image processing apparatus according to an aspect of the disclosure, a determining process is performed on the basis of a plurality of first representative distance values corresponding to columns of pixels belonging to the first image region, a plurality of second representative distance values corresponding to the columns of pixels belonging to the second image region, and pixel distance values of pixels of a distance image disposed between the first image region and the second image region. Therefore, it is possible to define image regions appropriately.

The effects described in the specification are mere examples and are not limited, and other effects may be achieved.

One or more of the representative-distance calculating unit 22 and the joining processing unit 26 in the processor 20 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the representative-distance calculating unit 22 and the joining processing unit 26. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the representative-distance calculating unit 22 and the joining processing unit 26 in the processor 20 illustrated in FIG. 1.

The invention claimed is:

1. An image processing apparatus comprising:
a representative-distance calculator configured to generate a plurality of representative distance values on a basis of a distance image generated from a stereo image, the stereo image including an image of at least one object including a vehicle, the distance image including distance values of pixels, the representative distance values corresponding to different pixel columns in the distance image and each being a representative value of the distance values of a corresponding one of the pixel columns; and
a joining processor configured to perform a joining process of joining a first image region and a second image region that are defined on a basis of the image of the at least one object in the stereo image, the first image region and the second image region being disposed apart from each other in the stereo image, wherein
the joining processor is configured
to perform a determining process of determining whether the first image region and the second image region each include an image of a side face of the vehicle, and
perform the joining process when the first image region and the second image region each include the image of the side face of the vehicle, wherein the joining processor is configured to perform the determining process on a basis of a plurality of first representative distance values out of the representative distance values, a plurality of second representative distance values out of the representative distance values, and pixel distance values, the first representative distance values corresponding to pixel columns belonging to the first image region, the second representative distance values corresponding to pixel columns belonging to the second image region, the pixel distance values comprising distance values of pixels in the distance image disposed between the first image region and the second image region.

2. The image processing apparatus according to claim 1, wherein the joining processor is configured to determine, in the determining process, whether the first image region and the second image region include images of different portions of the side face of the vehicle.

3. The image processing apparatus according to claim 1, wherein, in the determining process, the joining processor is configured to
generate an approximate straight line in a temporarily joined region on a basis of the first representative distance values and the second representative distance values, the temporarily joined region including the first image region and the second image region that are temporarily joined,
shift a plurality of coordinate points corresponding to the pixel distance values onto the approximate straight line in a coordinate plane having a horizontal axis direction of the distance image and a distance direction of the distance values,
calculate a density of the coordinate points shifted onto the approximate straight line and delete coordinate points disposed in an area having a low density among the coordinate points shifted onto the approximate straight line,
categorize coordinate points remaining on the approximate straight line into a first group and a second group, the first group corresponding to the first image region, the second group corresponding to the second image region, and
determine that the first image region and the second image region each include the image of the side face of the vehicle when a first distance along the approximate straight line is smaller than a predetermined distance, the first distance comprising a distance between one of the coordinate points in the first group and one of the coordinate points in the second group.

4. The image processing apparatus according to claim 2, wherein, in the determining process, the joining processor is configured to
generate an approximate straight line in a temporarily joined region on a basis of the first representative distance values and the second representative distance values, the temporarily joined region including the first image region and the second image region that are temporarily joined,
shift a plurality of coordinate points corresponding to the pixel distance values onto the approximate straight line in a coordinate plane having a horizontal axis direction of the distance image and a distance direction of the distance values,
calculate a density of the coordinate points shifted onto the approximate straight line and delete coordinate points disposed in an area having a low density among the coordinate points shifted onto the approximate straight line, categorize coordinate points remaining on the approximate straight line into a first group and a second group, the first group corresponding to the first image region, the second group corresponding to the second image region, and determine that the first image region and the second image region each include the image of the side face of the vehicle when a first distance along the approximate straight line is smaller than a predetermined distance, the first distance comprising a distance between one of the coordinate points in the first group and one of the coordinate points in the second group.

5. The image processing apparatus according to claim 3, wherein the joining processor is configured to perform the determining process when a second distance along the approximate straight line is larger than a predetermined distance, the second distance comprising a distance between a coordinate point corresponding to the first representative distance values and a coordinate point corresponding to the second representative distance values.

6. The image processing apparatus according to claim 4, wherein the joining processor is configured to perform the determining process when a second distance along the approximate straight line is larger than a predetermined distance, the second distance comprising a distance between a coordinate point corresponding to the first representative distance values and a coordinate point corresponding to the second representative distance values.

7. An image processing apparatus comprising
circuitry configured to
generate a plurality of representative distance values on a basis of a distance image generated from a stereo image, the stereo image including an image of at least one object including a vehicle, the distance image including distance values of pixels, the representative distance values corresponding to different pixel columns in the distance image and each being a representative value of the distance values of a corresponding one of the pixel columns, and perform a joining process of joining a first image region and a second image region that are defined on a basis of the image of the at least one object in the stereo image, the first image region and the second image region being disposed apart from each other in the stereo image, wherein the circuitry is configured to perform a determining process of determining whether the first image region and the second image region each include an image of a side face of the vehicle, and perform the joining process when the first image region and the second image region each include the image of the side face of the vehicle, wherein the circuitry is configured to perform the determining process on a basis of a plurality of first representative distance values out of the representative distance values, a plurality of second representative distance values out of the representative distance values, and pixel distance values, the first representative distance values corresponding to pixel columns belonging to the first image region, the second representative distance values corresponding to pixel columns belonging to the second image region, the pixel distance values comprising distance values of pixels in the distance image disposed between the first image region and the second image region.

* * * * *